US007347776B2

(12) United States Patent
Wright

(10) Patent No.: US 7,347,776 B2
(45) Date of Patent: Mar. 25, 2008

(54) LOTTERY TICKET PROVIDING FOR MULTIPLE GAMES

(75) Inventor: Robert Wright, Irving, TX (US)

(73) Assignee: Integrated Group Assets, Inc., Irving, TX (US)

( * ) Notice: Subject to any disclaimer, the term of this patent is extended or adjusted under 35 U.S.C. 154(b) by 0 days.

(21) Appl. No.: 11/043,913

(22) Filed: Jan. 25, 2005

(65) Prior Publication Data

US 2005/0282611 A1 Dec. 22, 2005

Related U.S. Application Data

(63) Continuation-in-part of application No. 10/766,676, filed on Jan. 27, 2004, now Pat. No. 6,935,948.

(51) Int. Cl.
*A63F 13/00* (2006.01)

(52) U.S. Cl. .......... 463/17

(58) Field of Classification Search .......... 463/17–19, 463/25–28

See application file for complete search history.

(56) References Cited

U.S. PATENT DOCUMENTS

| | | | | |
|---|---|---|---|---|
| 4,157,829 | A | 6/1979 | Goldman et al. | |
| 4,494,197 | A | 1/1985 | Troy et al. | |
| 4,652,998 | A | 3/1987 | Koza et al. | |
| 4,689,742 | A | 8/1987 | Troy et al. | |
| 5,083,784 | A | 1/1992 | Nilssen | |
| 5,282,620 | A | 2/1994 | Keesee | |
| 5,286,023 | A | 2/1994 | Wood | |
| 5,380,007 | A | 1/1995 | Travis et al. | |
| RE35,864 | E | 7/1998 | Weingardt | |
| 5,851,149 | A | 12/1998 | Xidos et al. | |
| 6,017,032 | A | 1/2000 | Grippo et al. | |
| 6,168,521 | B1 | 1/2001 | Luciano et al. | |
| 6,296,569 | B1 * | 10/2001 | Congello, Jr. | 463/17 |
| 6,416,408 | B2 | 7/2002 | Tracy et al. | |
| 6,527,175 | B1 | 3/2003 | Dietz et al. | |
| 6,554,710 | B1 | 4/2003 | Olson | |
| 6,572,106 | B2 | 6/2003 | Alexoff | |
| 6,648,753 | B1 | 11/2003 | Tracy et al. | |
| 6,692,354 | B2 | 2/2004 | Tracy et al. | |

(Continued)

OTHER PUBLICATIONS

McQueen, Patricia A. "Lotteries offer add-on games attached to existing online options." *International Gaming & Wagering Business*, Apr. 2004, pp. 22, 26-27.

*Primary Examiner*—Kim Nguyen
(74) *Attorney, Agent, or Firm*—Patent Ingenuity, P.C.; Samuel K. Simpson

(57) ABSTRACT

A method is disclosed that provides a lottery ticket at a known single price that is selected from a plurality of distinct price categories. The lottery ticket provides for distinct games. The games can be lottery type games. The lottery ticket is provided and includes a plurality of lottery numbers. Each of the lottery numbers corresponds to a distinct lottery game with a distinct lottery prize that can be won with a winning lottery number. A first lottery number is indicated on the lottery ticket. The first lottery number corresponds to a first distinct lottery game. A variable prize corresponding to the first lottery game is provided. Further, a second lottery number is also indicated on the lottery ticket. The second lottery number corresponds to a second distinct lottery game. A fixed prize is provided that corresponds to the second lottery game.

62 Claims, 11 Drawing Sheets

U.S. PATENT DOCUMENTS

| | | | | |
|---|---|---|---|---|
| 2003/0003984 | A1 | 1/2003 | Petruzzi | |
| 2003/0069059 | A1 | 4/2003 | Stanek | |
| 2003/0186735 | A1 | 10/2003 | Byrne | |
| 2003/0190959 | A1 | 10/2003 | Olson | |
| 2003/0232651 | A1 | 12/2003 | Huard et al. | |
| 2004/0173965 | A1 | 9/2004 | Stanek | |
| 2004/0245722 | A1 * | 12/2004 | Henderson | 273/269 |

* cited by examiner

300

Jackpot = $10,000,000

| Price Category | Jackpot % |
|---|---|
| $3 | 100% |
| $2 | 50% |
| $1 | 25% |

LOTTERY TICKET PROVIDING FOR MULTIPLE GAMES

This application is a Continuation-In-Part application of U.S. patent application Ser. No. 10/766,676, filed on Jan. 27, 2004, entitled MULTIPLE PRICING SHARED SINGLE JACKPOT IN A LOTTERY by Robert J. Wright, now issued U.S. Pat. No. 6,935,948, issued on Aug. 30, 2005, which is hereby incorporated by reference in its entirety.

BACKGROUND

1. Field

A system and method are disclosed which generally relate to gaming, and more specifically to lotteries.

2. General Background

A lottery is generally a distribution of tokens such that a subset of the distributed tokens may win a prize. The token can be in the form of a ticket. One of the most popular forms of lottery involves the distribution of lottery tickets. Each lottery ticket includes a lottery number. After the lottery tickets have been distributed to the lottery ticket holders, the winning number is chosen. The usual method of selecting the winning number involves a random selection of the winning number. A random number generator can be used to randomly select the winning number. Some lottery systems require the ticket to have the entire number that is randomly selected while other lottery systems require the ticket to have a superset of an ordered sequence of numbers that are randomly selected.

Lotteries are normally used by jurisdictions according to a pari-mutuel model in which the prize is funded by a portion of the ticket sales. One potential problem with the pari-mutuel model is that a sufficient number of tickets need to be sold in order to provide a reasonable lottery prize. However, interest in purchasing lottery tickets is generally stimulated only when the prize becomes substantial. For instance, a large number of lottery tickets are purchased in a $10 million dollar lottery, but a disproportionately large number of lottery tickets are purchased in a $50 million dollar lottery.

In addition, traditional lotteries sell tickets for one price. If there are multiple winners of a jackpot, the winners split the jackpot prize.

SUMMARY

In one aspect, there is a method of providing a lottery ticket at a known single price selected from a plurality distinct price categories. The lottery ticket is for a plurality of distinct lottery games. In another aspect, the lottery ticket is purchased for the known single price, the lottery ticket including a plurality of lottery numbers. Each of the lottery numbers corresponds to a distinct lottery game with a distinct lottery prize that can be won with a winning lottery number. In one aspect, indicated on the lottery ticket is a first lottery number corresponding to a first distinct lottery game, the first distinct lottery game being won by a ticket holder of the lottery ticket if the first lottery number is a winning lottery number. In another aspect, a variable prize corresponds to the first distinct lottery game. The variable prize is distributed according to one of a plurality of distinct known percentages. A determination of the distinct known percentage of the variable prize is based on a player's selection of the known single price from the plurality of distinct price categories from which the lottery ticket can be purchased. In one aspect, indicated on the lottery ticket is a second lottery number, distinct from the first lottery number, corresponding to a second lottery game, distinct from the first lottery game. The second lottery game is won by the ticket holder of the lottery ticket if the second lottery number is a winning lottery number. In another aspect, a fixed prize corresponds to the second lottery game, the fixed prize being distributed according to a distribution associated with the known single price.

In one aspect, there is a first lottery game based on a sharing percentage format.

In another aspect, the second lottery game is an instant daily game.

In one aspect, the first lottery number is a number determined by a potential ticket holder.

In another aspect, the second lottery number is a quick pick number.

In one aspect, the second lottery number is pre printed on the lottery ticket.

In another aspect, the variable prize is a probabilistic jackpot.

In one aspect, the variable prize is guaranteed by a third party entity.

In another aspect, the fixed prize is guaranteed by a third party entity.

In one aspect, multiple winners of the variable distribution share according to an intrasharing distribution.

In another aspect, multiple winners of the variable distribution share according to an intersharing distribution.

In one aspect, multiple winners share according to an intrasharing distribution and an intersharing distribution.

In another aspect, there is a method of providing a plurality of distinct lottery games on a single lottery ticket. In one aspect, the single lottery ticket is purchased for a single known price selected from a plurality of distinct known price categories. The single lottery ticket includes a plurality of lottery numbers, each of the lottery numbers corresponding to a distinct lottery game with a distinct lottery prize that can be won with a winning lottery number. In another aspect, indicated on the single lottery ticket is a first lottery number corresponding to a first lottery game, the first lottery game being won by a ticket holder of the lottery ticket if the first lottery number is a winning lottery number. In one aspect, there is a drawing of a variable prize winning lottery number for the first lottery game. In another aspect, indicated on the single lottery ticket is a second lottery number, distinct from the first lottery number, corresponding to a second lottery game. The second lottery game is distinct from the first lottery game. The second lottery game is won by the ticket holder of the lottery ticket if the second lottery number is a winning lottery number. In one aspect, there is a drawing of a fixed prize winning lottery number for the second lottery game. The drawing of the fixed prize winning lottery number occurs on a day prior to the day of the variable prize drawing.

In another aspect, the first lottery game is based on a sharing percentage format.

In one aspect, the second lottery game is an instant daily game.

In another aspect, the first lottery number is a number determined by a potential ticket holder.

In one aspect, the second lottery number is a quick pick number.

In another aspect, the second lottery number is pre printed on the lottery ticket.

In one aspect, the variable prize is a probabilistic jackpot.

In another aspect, the variable prize is guaranteed by a third party entity.

In one aspect, the fixed prize is guaranteed by a third party entity.

In another aspect, multiple winners of the variable distribution share according to an intrasharing distribution.

In one aspect, multiple winners of the variable distribution share according to an intersharing distribution.

In another aspect, multiple winners share according to an intrasharing distribution and an intersharing distribution.

In one aspect, there is a method of providing a plurality of distinct lottery games in a single lottery ticket. In another aspect, the single lottery ticket is purchased for a single known price. The single lottery ticket includes a plurality of lottery numbers, each of the lottery numbers corresponding to a distinct lottery game with a distinct lottery prize that can be won with a winning lottery number. In one aspect, on the single lottery ticket is a first lottery number corresponding to a first lottery game. The first lottery game is won by a ticket holder of the lottery ticket if the first lottery number is a winning lottery number. In another aspect, there is a drawing of a variable prize winning lottery number for the first lottery game, the first lottery game having a variable prize. In one aspect, indicated on the single lottery ticket is a second lottery number corresponding to a second lottery game. The second lottery game is distinct from the first lottery game. The second lottery game is won if the second lottery number is a winning lottery number. In another aspect, there is a drawing of a fixed prize winning lottery number for the second lottery game, the second lottery game distinct from the first lottery game. The drawing of the fixed prize winning lottery number occurs on a day prior to the day of the variable prize drawing.

In one aspect, the first distinct lottery game is based on a sharing percentage format.

In another aspect, the second lottery game is an instant daily game.

In one aspect, the first lottery number is a number determined by a potential ticket holder.

In another aspect, the second lottery number is a quick pick number.

In one aspect, the second lottery number is pre printed on the lottery ticket.

In another aspect, the variable prize is a probabilistic jackpot.

In one aspect, the variable prize is guaranteed by a third party entity.

In another aspect, the fixed prize is guaranteed by a third party entity.

In one aspect, multiple winners of the variable distribution share according to an intrasharing distribution.

In another aspect, multiple winners of the variable distribution share according to an intersharing distribution.

In one aspect, multiple winners share according to an intrasharing distribution and an intersharing distribution.

In another aspect, there is a method of providing a lottery ticket at a known single price selected from a plurality of price categories, the lottery ticket being for a plurality of distinct lottery games. In one aspect, the lottery ticket is purchased for the known single price, the lottery ticket including a plurality of lottery numbers. Each of the lottery numbers corresponds to a distinct lottery game with a distinct lottery prize that can be won with a winning lottery number. In another aspect, indicated on the lottery ticket is a first lottery number corresponding to a first lottery game, the first distinct lottery game being won by a ticket holder of the lottery ticket if the first lottery number is a winning lottery number. In one aspect, a variable prize corresponds to a first lottery game, the variable prize being distributed according to one of a plurality of distinct known percentages. A determination is made of the distinct known percentage of the variable prize based on a player's selection of the known single price from the plurality of price categories from which the lottery ticket can be purchased. The variable prize is increased by a first increase, which corresponds to a first distinct portion of accumulated ticket sales. In another aspect, indicated on the lottery ticket is a second lottery number corresponding to a distinct lottery game, the second lottery game distinct from the first lottery game. The second lottery game is won if the second lottery number is a winning lottery number. In one aspect, there is a fixed variable combination prize corresponding to a second distinct lottery game, the fixed variable prize being distributed so that a first portion is a distinct known fixed distribution and so that a second portion is a variable distribution distributed according to the distinct known percentage. The variable distribution of the second portion increases by a second increase corresponding to a second distinct portion of accumulated ticket sale.

In another aspect, multiple winners of the variable prize distribution share according to an intrasharing distribution.

In one aspect, multiple winners of the variable prize distribution share according to an intersharing distribution.

In another aspect, multiple winners share the variable prize distribution according to an intrasharing distribution and an intersharing distribution.

In one aspect, the first distinct lottery game is based on a sharing percentage format.

In another aspect, the second lottery game is an instant daily game.

In one aspect, the first lottery number is a number determined by a potential ticket holder.

In another aspect, the second lottery number is a quick pick number.

In one aspect, the second lottery number is pre printed on the lottery ticket.

In another aspect, the variable prize is a probabilistic jackpot.

In one aspect, the variable prize is guaranteed by a third party entity.

In another aspect, the fixed prize is guaranteed by a third party entity.

In one aspect, multiple winners of the variable distribution share according to an intrasharing distribution.

In another aspect, multiple winners of the variable distribution share according to an intersharing distribution.

In one aspect, multiple winners share according to an intrasharing distribution and an intersharing distribution.

In another aspect, there is a lottery ticket dispensing machine containing a price category reception module.

In one aspect, the price category reception module receives a selection of a price category from a first price category and a second price category. The first price category is associated with a first variable prize distribution of a first lottery game and is associated with a first fixed prize distribution of a second lottery game. The second lottery game is distinct from the first lottery game. The second price category is associated with a second variable prize distribution of the first lottery game and is associated with a second fixed prize distribution of the second lottery game. The second variable prize distribution is distinct from the first variable prize distribution. The second fixed prize distribution is distinct from the first prize distribution. In another aspect, the user input module receives an input from a user indicating the price category that that the user selects from the first price category and the second price category. In one aspect, the lottery ticket printer prints a lottery ticket from the price category that is received from the price category reception module. The lottery ticket includes a first lottery number for the first lottery game and a second lottery number for the second lottery game. In another aspect, the controller receives the first price category from the price category reception module. The controller receives the second price category from the price category reception module. The controller receives the input from the user. The controller provides an instruction to the lottery ticket printer to print the lottery ticket according to the input.

In one aspect, multiple winners of the variable distribution share according to an intrasharing distribution.

In another aspect, multiple winners of the variable distribution share according to an intersharing distribution.

In one aspect, multiple winners share according to an intrasharing distribution and an intersharing distribution.

In another aspect, the first distinct lottery game is based on a sharing percentage format.

In one aspect, the second lottery game is an instant daily game.

In another aspect, the first lottery number is a number determined by a potential ticket holder.

In one aspect, the second lottery number is a quick pick number.

In another aspect, the second lottery number is pre printed on the lottery ticket.

In one aspect, the variable prize is a probabilistic jackpot.

In another aspect, the variable prize is guaranteed by a third party entity.

In one aspect, the fixed prize is guaranteed by a third party entity.

In another aspect, the selection of the price category is from a third price category in addition to the first price category and the second price category.

In one aspect, the third price category is associated with a third variable prize distribution of the first lottery game and associated with a third fixed prize distribution of the second lottery game. The third variable prize distribution is distinct from the first variable prize distribution and distinct from the second variable prize distribution. The third fixed prize distribution is distinct from the first fixed prize distribution and distinct from the second fixed prize distribution.

DRAWINGS

The above-mentioned features and objects of the present disclosure will become more apparent with reference to the following description taken in conjunction with the accompanying drawings wherein like reference numerals denote like elements and in which:

FIG. 1 illustrates a single priced lottery system that is based on a pari-mutuel model.

FIG. 2 also illustrates that a ticket holder can purchase a lottery ticket in a second price category.

FIG. 5 illustrates an example of a winnings table of a lottery having two three-dollar ticket winners.

FIG. 6 illustrates an example of a winnings table of a lottery having one three-dollar ticket winner and one one-dollar ticket winner.

FIG. 7 illustrates an example of a winnings table of a lottery having two three-dollar ticket winners and two one-dollar ticket winners.

FIG. 8 illustrates an example of a winnings table of a lottery having one three-dollar ticket winner, one two-dollar ticket winner, and one one-dollar ticket winner.

DETAILED DESCRIPTION

Figure 1:
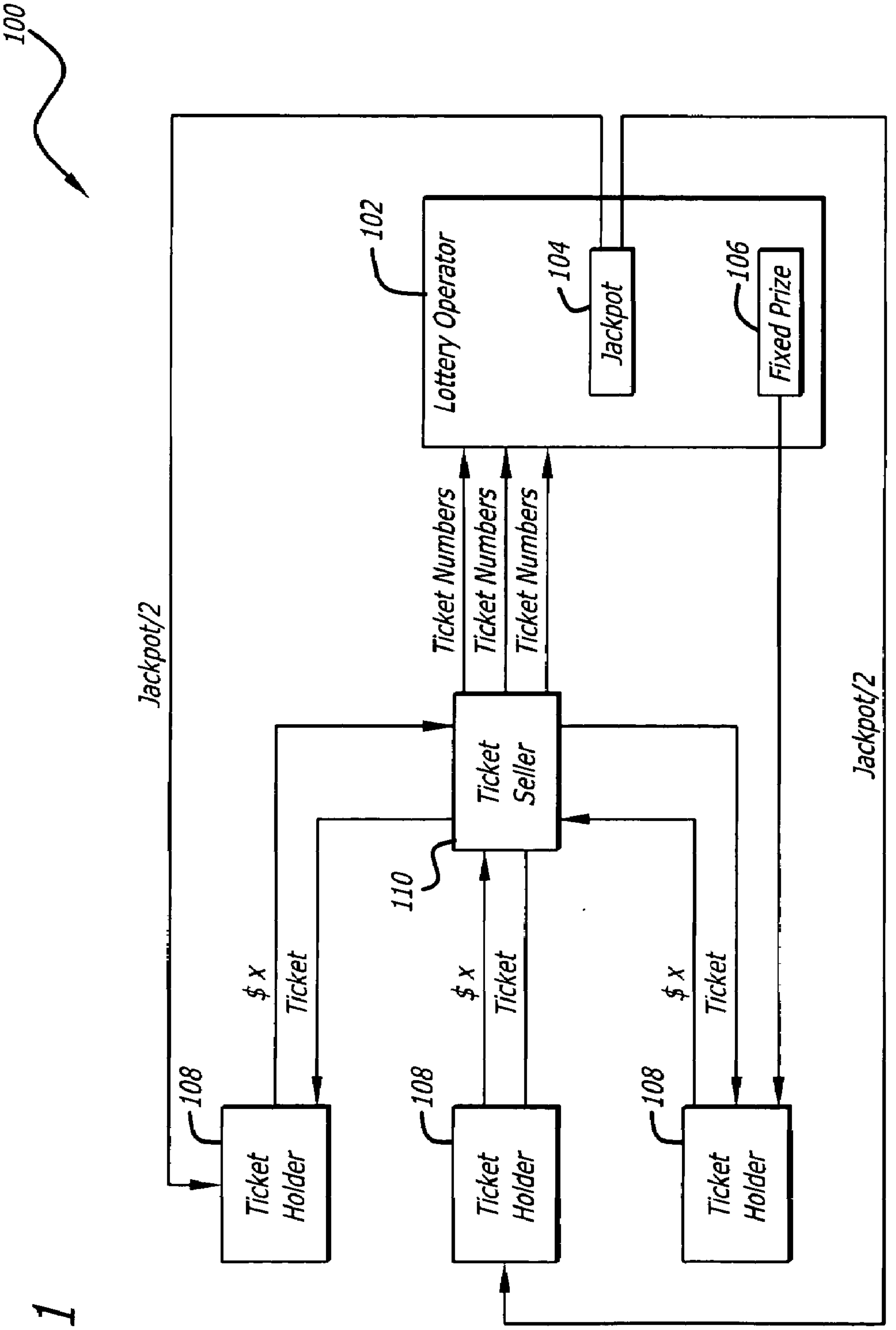

A method of multiple pricing for a predetermined single jackpot in a single lottery game is disclosed. For instance, a lottery ticket that is purchased for one dollar can result in a ten million dollar win, a lottery ticket that is purchased for two dollars can result in a twenty million dollar win, a lottery ticket that is purchased for three dollars can result in a thirty million win, etc. The difference in increments is not limited to a set increment. For instance, in the example above, a ten million dollar increment existed between the advertised winnings for each price category of tickets. However, any increment can be used. For instance, a lottery ticket that is purchased for one dollar can result in a ten million dollar win, a lottery ticket that is purchased for two dollars can result in a twenty million dollar win, a lottery ticket that is purchased for three dollars can result in a forty million dollar win, etc. In one embodiment, a larger increment can be used to induce purchase of a higher sale ticket.

Each price category can be associated with a percentage of a jackpot. For instance, a one-dollar ticket can win twenty five percent of the jackpot, a two-dollar ticket can win fifty percent of the jackpot, and a three-dollar ticket can win one hundred percent of the jackpot. In one embodiment, the actual winnings are not limited to the advertised winnings. The jackpot can increase with a percentage of each ticket sale being contributed to the jackpot. For instance, if the one-dollar ticket winner is the only winner, the one-dollar ticket winner can win twenty five percent of a larger jackpot than initially advertised. In effect, the one-dollar ticket winner is winning more than twenty five percent of the initial jackpot.

The prizes are won from a single pool. For instance, even if the revenues for the one-dollar ticket do not cover the ten million dollar prize, the combined revenues of the one dollar and the two-dollar tickets are likely to cover the ten million dollar prize and vice versa. In one embodiment, a shared multiple pricing lottery game with a single pre-determined jackpot is disclosed. For, example, a lottery player having a one-dollar ticket attempting to win ten million dollars and a lottery player having a two-dollar ticket attempting to win twenty million dollars can both win a prize. The lottery player having the one-dollar ticket will receive a portion of the ten million dollar prize and will have to share the other portion with the lottery player having the two-dollar ticket. Accordingly, the two-dollar ticket holder receives the remaining portion of the ten million dollars and an additional ten million dollars because the two-dollar ticket holder would have been entitled to twenty million dollars if the two-dollar ticket holder won the lottery alone. The shared multiple pricing lottery game is not limited to one dollar and two-dollar tickets. For example, a three-dollar ticket could also be provided. The three-dollar ticket holder would share the lottery prize with the two-dollar ticket holder and the one-dollar ticket holder in a similar manner to which the two-dollar ticket holder shared the lottery prize with the one-dollar ticket holder.

The average revenue per ticket sold of the multiple pricing revenues can result in higher revenue than traditional lottery systems. A lottery may be able to cut down on expenses by paying less to ticket holders that purchase the inexpensive tickets while at the same time attracting more ticket holders who will only play if the jackpot is large. The multiple pricing system can be used independently or in conjunction with the entity as discussed above.

In one embodiment, fixed prizes can be offered in addition to or without the jackpot prize. A fixed prize is a prize that is not shared. If a lottery player has the winning number for a fixed prize, the lottery player receives the entire fixed prize. If multiple lottery players have the winning numbers for the fixed prize, then multiple lottery players each receive the entire fixed prize without having to share the fixed prizes with the other players. The fixed prize is different from the jackpot prize in which multiple winners share the jackpot prize. The fixed prizes can be distributed in entirety to multiple players because the fixed prizes are generally much smaller than the jackpot prize. In one embodiment, the fixed prize can be the jackpot prize. Multiple players could win the jackpot prize without having to share the jackpot prize.

FIG. 1 illustrates a single priced lottery system 100 that is based on a pari-mutuel model. A lottery operator 102 establishes the lottery. The lottery operator 102 can be a jurisdiction such as a state, city, town, municipality, or any division or department thereof. Further, the lottery operator 102 can be a private organization that a jurisdiction hires to coordinate the lottery. The lottery operator 102 can also be a private organization that is not hired by a jurisdiction. The coordination involved can include establishment, maintenance, and/or winnings determination.

The lottery operator 102 can advertise that a lottery has a prize. For example, the lottery operator 102 can advertise that the lottery prize will be a minimum of ten million dollars. The lottery operator 102 provides the lottery prize from a jackpot 104. The lottery operator 102 can also provide a fixed prize 106. In one embodiment, ticket holders 108 purchase tickets at a price of $x per ticket from a ticket seller 110. The ticket seller then sends the ticket numbers on each of the tickets to the lottery operator 102. If one of the ticket holders 108 wins the lottery, the lottery operator 102 disburses the jackpot 104 to the ticket holder 108. On the other hand, if multiple ticket holders 108 win the lottery, the multiple ticket holders with the winning tickets split the jackpot 104. For instance, FIG. 1 illustrates two ticket holders 108 winning the lottery. The lottery operator 102 then splits the jackpot 104 and distributes half of the jackpot to each of the ticket holders 108.

The lottery operator 102 can also distribute a fixed prize 106. A ticket holder 108 can win a fixed prize that the ticket holder 108 does not have to share with other ticket holders 108. For instance, if multiple ticket holders 108 won the fixed prize 106, the lottery operator 102 would distribute the fixed prize 106 in its entirety to each of the multiple ticket holders 108 that won the fixed prize 106.

In one embodiment, the lottery operator 102 can use a random number generator (not shown) to determine the winning number. In another embodiment, the lottery operator 102 can use a ball draw machine to randomly select the winning number.

One of the difficulties of the single priced lottery system 100 is that the single priced lottery system 100 does not optimize the price paid for a lottery ticket and the payment of the jackpot 104. Some ticket holders 108 may want to purchase a less expensive lottery ticket even if the associated prize is relatively small. Further, some ticket holders 108 may not wish to purchase a lottery ticket unless the jackpot 104 is very large. These ticket holders 108 may be willing to pay more for a lottery ticket that provides a large prize. Further, some ticket holders 108 generally buy lottery tickets in almost any lottery regardless of the size of the jackpot 104. The single price lottery system 100 is not optimized to provide lottery tickets at a price with an associated lottery prize.

Figure 2:
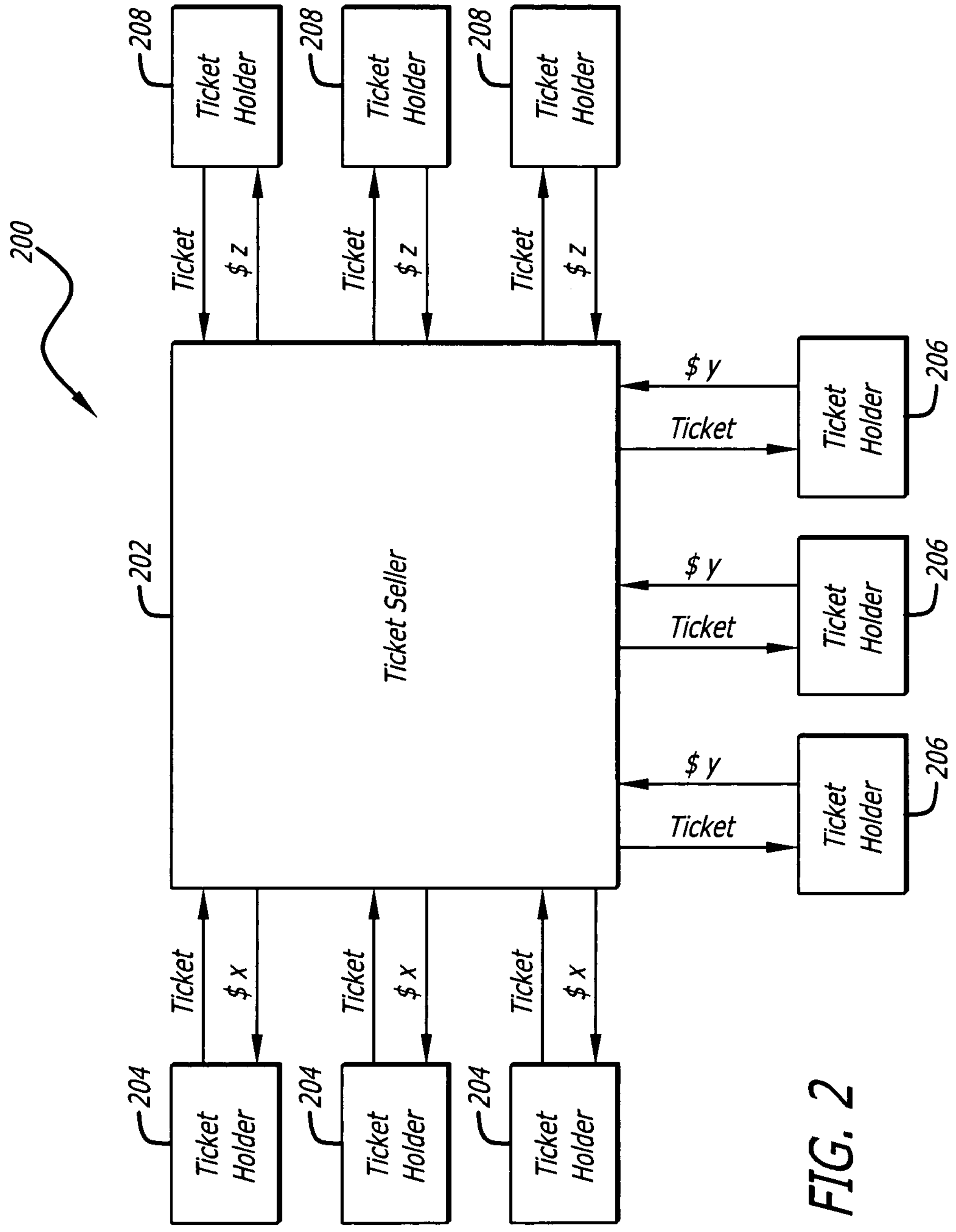

FIG. 2 illustrates a shared multiple priced single pool lottery system 200. A ticket seller 202 provides lottery tickets according to different price categories. A ticket holder 204 can purchase a lottery ticket in a first price category. For instance, the first price category can be lottery tickets purchased for $x. The first price category is associated with a first percentage of a lottery prize that can be won. For example, the ticket holder 204 may have purchased the lottery ticket for one dollar in order to win twenty five percent of the jackpot. In one embodiment, the advertised jackpot is increased with a percentage of ticket sales revenue. Therefore, the ticket holder 204 can win twenty five percent of a larger jackpot than initially advertised. In one embodiment, the jackpot is increased with a percentage of the revenue from each ticket sold. In other words, a minimum amount of ticket sales is not required for the contribution of ticket sales revenue into the jackpot. The addition of a percentage of ticket sales to the jackpot is a progressive jackpot. In essence, a variable prize is offered with a progressive jackpot. The prize can increase with each ticket sale. In one embodiment, the prize increases with a portion of the ticket sales. In another embodiment, the progressive jackpot can be divided among multiple winners. In one embodiment, a minimum amount of ticket sales is not required. The lottery prize can be a variable prize from the outset. A percentage of each ticket sale can be contributed to the variable prize jackpot.

In one embodiment, the progressive model can be applied so that each price category benefits. If the jackpot increases in size, winnings for each price category can increase because the jackpot increases.

In one embodiment, if the only winning lottery ticket or winning lottery tickets are in the first price category, then the first percentage is distributed according to a first price category intra-sharing distribution formula. In one embodiment, the first price category intra-sharing distribution formula requires an even distribution among all the winners in the first price category. In the example above, if two ticket holders 204 have winning ticket numbers, the two ticket holders 204 share the first percentage evenly. In the example, the first percentage of the prize was twenty five percent. Therefore, the two ticket holders 204 would each receive twelve and one half percent of the prize. In one embodiment, if the ticket holder 204 is the only winning ticket in the lottery, the first price category intra-sharing distribution formula provides the entirety of the first percentage of the prize to the ticket holder 204. In this example, the ticket holder 204 would receive twenty five percent of the prize.

In another embodiment, the first price category intra-sharing distribution formula can be weighted in favor of previous ticket purchases. For example, if two ticket holders 204 are the only ticket winners in the lottery, one of the ticket holders 204 may have purchased one hundred lottery tickets In previous lotteries where as the other one of the ticket holders 204 may have purchased a lottery ticket for the first time. The first price category intra-sharing distribution formula can include a frequent lottery variable that would provide a larger portion of the first percentage to the ticket holder 204 that previously purchased one hundred tickets. For example, the ticket holder 204 that purchased one hundred tickets may receive twenty percent of the prize where as the ticket holder 204 that only purchased one ticket may receive only five percent of the prize. This is only one example. The frequent lottery variable can also provide a small change. For instance, the ticket holder 204 that purchased one hundred tickets may receive thirteen percent of the prize and the thicket holder 204 that purchased one ticket may receive twelve percent prize. The lottery operator 102 may find that use of the frequent lottery variable provides more incentive to ticket holders 204 to participate in the lottery. The first price category intra-sharing distribution formula can be determined according to consumer demand. One of ordinary skill in the art will recognize that a variety of formulae can be used for weighting the distribution. The first price category intra-sharing distribution formula can be a variable, a ratio, etc.

In one embodiment, the lottery prize is a jackpot. In alternative embodiments, other types of prizes can be used. The prize is not limited to jackpots.

FIG. 2 also illustrates that a ticket holder 206 can purchase a lottery ticket in a second price category. For instance, the second price category can be lottery tickets purchased for $y. The second price category is associated with a second percentage of a lottery prize that can be won. For example, the ticket holder 206 may have purchased the lottery ticket for two dollars in order to win fifty percent of the jackpot. In one embodiment, if the only winning lottery ticket or winning lottery tickets are in the second price category, then the second percentage is distributed according to a second price category intra-sharing distribution formula. In one embodiment, the second price category intra-sharing distribution formula requires an even distribution among all the winners in the second price category. In the example above, if two ticket holders 206 have winning ticket numbers, the two ticket holders 206 share the second percentage evenly. In the example, the second percentage of the prize was fifty percent. Therefore, the two ticket holders 206 would each receive twenty five percent of the prize. In one embodiment, if the ticket holder 206 is the only winning ticket in the lottery, the second price category intra-sharing distribution formula provides the entirety of the second percentage of the prize to the ticket holder 206. In this example, the ticket holder 206 would receive fifty percent of the jackpot.

In one embodiment, the second price category intra-sharing distribution formula is weighted. The second price category intra-sharing distribution formula can be weighted in a similar manner as the first price category intra-sharing distribution formula. For instance, a frequent lottery variable can be used. One of ordinary skill in the art will recognize that a variety of formulae can be used for weighting the distribution. The second price category intra-sharing distribution formula can be a variable, a ratio, etc.

In one embodiment, if a ticket holder 204 and a ticket holder 206 have winning lottery tickets, an inter-sharing distribution formula is used to determine how the ticket holder 204 and the ticket holder 206 should share the jackpot. In one embodiment, the lottery operator 102 splits the first percentage so that the ticket holder 204 receives half of the first percentage and the ticket holder 206 receives half of the first percentage. The ticket holder 206 additionally receives the second percentage minus the first percentage. For example, if the first percentage is twenty five percent and the second percentage is fifty percent, the ticket holder 204 would receive twelve and one half percent. The ticket holder 206 would receive twelve and one half percent in addition to twenty five percent. Therefore, the ticket holder 206 would receive thirty seven and one half percent. The inter-sharing distribution formula is not limited to an even distribution. In one embodiment, the inter-sharing distribution formula is weighted to favor the higher price category. In other words, the ticket holder 206 may be rewarded for paying a higher ticket price. For example, the ticket holder 204 may only receive one third of the twenty five percent with the ticket holder 206 receiving two thirds of the twenty five percent in addition to an entire twenty five percent.

Although each ticket price is associated with a percentage of the jackpot, the winnings come from a single jackpot. In the example above, even if only one ticket is purchased in the first price category, the ticket holder 204 that has the winning number gets to receive twenty five percent of a jackpot that is mostly funded by other price categories. Variations may occur from lottery to lottery in the numbers of tickets purchased in each price category. The lottery operator 102 increases the chances that the jackpot will be sufficient to cover winnings in each of the price categories by having a single pool from which disbursements are made for winnings in any of the price categories. The use of the single pool for multiple priced lottery tickets can be used independently of the sharing methodology discussed above. However, the lottery operator 102 can further optimize the costs associated with the lottery by using the single pool in conjunction with the sharing methodology. Further, the intra-sharing methodology can be used independently of the inter-sharing methodology. However, the lottery operator 102 can optimize costs by using the intra-sharing methodology in conjunction with the inter-sharing methodology.

FIG. 2 also illustrates that a ticket holder 208 can purchase a lottery ticket in a third price category. For instance, the third price category can be lottery tickets purchased for $z. The third price category is associated with a third percentage of a lottery prize that can be won. For example, the ticket holder 208 may have purchased the lottery ticket for three dollars in order to win one hundred percent of the jackpot. In one embodiment, if the only winning lottery ticket or winning lottery tickets are in the third price category, then the third percentage is distributed according to a third price category intra-sharing distribution formula. In one embodiment, the third price category intra-sharing distribution formula requires an even distribution among all the winners in the third price category. In the example above, if two ticket holders 208 have winning ticket numbers, the two ticket holders 208 share the third percentage evenly. In the example, the third percentage of the prize was one hundred percent. Therefore, the two ticket holders 208 would each receive fifty percent of the prize. In one embodiment, if the ticket holder 208 is the only winning ticket in the lottery, the third price category intra-sharing distribution formula provides the entirety of the third percentage of the prize to the ticket holder 208. In this example, the ticket holder 208 would receive one hundred percent of the jackpot.

In one embodiment, the third price category intra-sharing distribution formula is weighted. The third price category intra-sharing distribution formula can be weighted in a similar manner as the first price category intra-sharing distribution formula. For instance, a frequent lottery variable can be used. One of ordinary skill in the art will recognize that a variety of formulae can be used for weighting the distribution. The third price category intra-sharing distribution formula can be a variable, a ratio, etc.

In one embodiment, if the ticket holder 204, the ticket holder 206, and the ticket holder 208 have winning lottery tickets, a first triplet inter-sharing distribution formula is used to determine how the ticket holder 204, the ticket holder 206, and the ticket holder 208 should share the first percentage of the jackpot. In one embodiment, the lottery operator 102 splits the first percentage so that the ticket holder 204 receives one third of the first percentage, the ticket holder 206 receives one third of the first percentage, and the ticket holder 208 receives one third of the first percentage. A second triplet inter-sharing distribution formula is used to determine how the ticket holder 206 and the ticket holder 208 share the second percentage minus the first percentage. In one embodiment, the lottery operator 102 splits the second percentage so that the ticket holder 206 receives one half of the second percentage and the ticket 208 receives the other half of the second percentage. The ticket holder 208 additionally receives the third percentage minus the second percentage. For example, if the first percentage is twenty five percent, the second percentage is fifty percent, and the third percentage is one hundred percent, the ticket holder 204 would receive eight and one third percent. The ticket holder 206 would receive eight and one third percent in addition to twelve and one half percent. Therefore, the ticket holder 206 would receive twenty and five sixths percent. Finally, the ticket holder 208 would receive eight and one third percent in addition to twelve and one half percent in addition to fifty percent. Therefore, the ticket holder 208 would receive seventy and five sixths percent.

The first triplet inter-sharing distribution formula can require an even distribution of the first percent. However, in one embodiment, the first triplet inter-sharing distribution formula can be weighted. The ticket holder 206 can be given a greater portion of the first percent than the ticket holder 204. Further, the ticket holder 208 can be given a greater portion of the first percentage than the ticket holder 206. However, different variations are possible. A frequent lottery variable can be used to determine weighting. In other words, the ticket holder 204 could potentially receive the largest portion of the first percentage if the ticket holder 204 has purchased the most lottery tickets in the past. Further, the ticket holder 204 may receive the largest weighting of the first percent to give incentive to the ticket holder 204 because the ticket holder 204 does not get to receive a portion of the second percentage or of the third percentage. Accordingly, the ticket holder 206 may receive a greater weighted portion of the second percentage than the ticket holder 208 because the ticket holder 206 does not receive a portion of the third percentage. These weighted variations can also be used with the second triplet inter-sharing distribution formula.

The example above discusses the possibility of having one winning ticket from each price category. In one embodiment, multiple ticket winners exist in some or all of the different price categories. A divided intra-sharing distribution within each price category is applied so that winners in each price category split the winnings according to a divided intra-sharing distribution formula. In the example above, the ticket holder 204 received eight and one third percent. In one embodiment, a first divided intra-sharing distribution formula determines how to split the winnings for the first percentage. For instance, in the example above, if two ticket holders 204 had winning numbers, one of the ticket holders 204 could receive approximately four and sixteen one hundredths percent and the other ticket holder 204 would also receive approximately four and sixteen one hundredths percent. In one embodiment, a second divided intra-sharing distribution formula determines how to split the winnings for the second percentage. For instance, in the example above, if two ticket holders 206 had winning numbers, one of the ticket holders 206 would receive ten and three twelfths percent and the other ticket holder 206 would also receive ten and three twelfths percent. In one embodiment, a third divided intra-sharing distribution formula determines how to split the winnings for the third percentage. For instance, in the example above, if two ticket holders 208 had winning numbers, one of the ticket holders 208 would receive thirty five and three twelfths percent while the other one of the ticket holders 208 would also receive thirty five and three twelfths percent. The divided intra-shared distributions do not have to be the same across price categories. Further, within price categories, the divided intra-shared distributions can be weighted as discussed above with respect to the intra-sharing distributions.

Although, in the above discussion, the first price category was associated with the ticket holder 204, the second price category with the ticket holder 206, and the third price category with the ticket holder 208, the ticket holders can be associated with different price categories. For instance, the first price category may be associated with the ticket holder 204 and the third price category may be associated with the ticket holder 206. The inter-sharing distribution variable as discussed above could be used to share the jackpot if the ticket holder 204 and the ticket holder 206 were the only winning tickets. For instance, the ticket holder 204 would receive one half of twenty five percent. The ticket holder 206 would receive one half of twenty five percent in addition to seventy five percent. Further, the methodologies discussed above can be extended to any number of price categories. For instance, there could be a fourth price category. Any number of price categories can be used.

In one embodiment, the shared multiple priced single pool lottery system 200 can be used with a video lottery game. In another embodiment, the shared multiple priced single pool lottery system 200 can be used with online lotteries that are provided on a network such as the Internet.

In one embodiment the shared multiple priced single pool lottery system 300 can be computerized. Software modules can be used to establish and coordinate the multiple priced single pool lottery system. The use of computerized technologies can help facilitate calculating the sharing distributions. Without the computerized technologies, the quantity of the calculations could be burdensome.

A first price category module can provide a first price category in which a plurality of first price category lottery tickets can be purchased. Further, a second price category module can provide a second price category in which a plurality of first price category lottery tickets can be purchased. In addition, a random number selection module can randomly select the winning lottery number. The random number selection module can be a random number generator, can be couple to a ball draw machine, or can simulate a ball draw machine. A first price intra-shared distribution module provides a first price category intra-shared distribution of the first percentage of the prize if at least one of the lottery tickets in the plurality of first price category lottery tickets has a winning number. Further, a second price category intra-shared distribution module provides a second price category intra-shared distribution of the second percentage of the prize if at least one of the lottery tickets in the plurality of second price category lottery tickets has a winning number. Additional intrashared distribution modules can be used for additional price categories.

In one embodiment, a divided first price category intra-shared distribution module provides a divided first price category intra-shared distribution of the first percentage of the prize. In addition a divided second price category intra-shared distribution module provides a divided second price category intra-shared distribution of the second percentage of the prize. An inter-shared distribution module provides an inter-shared distribution of the first percentage of the prize if at least one of the lottery tickets in the plurality of first price category lottery tickets has a winning number and if at least one of the lottery tickets in the plurality of second price category lottery tickets has a winning number.

Figures 3, 10:
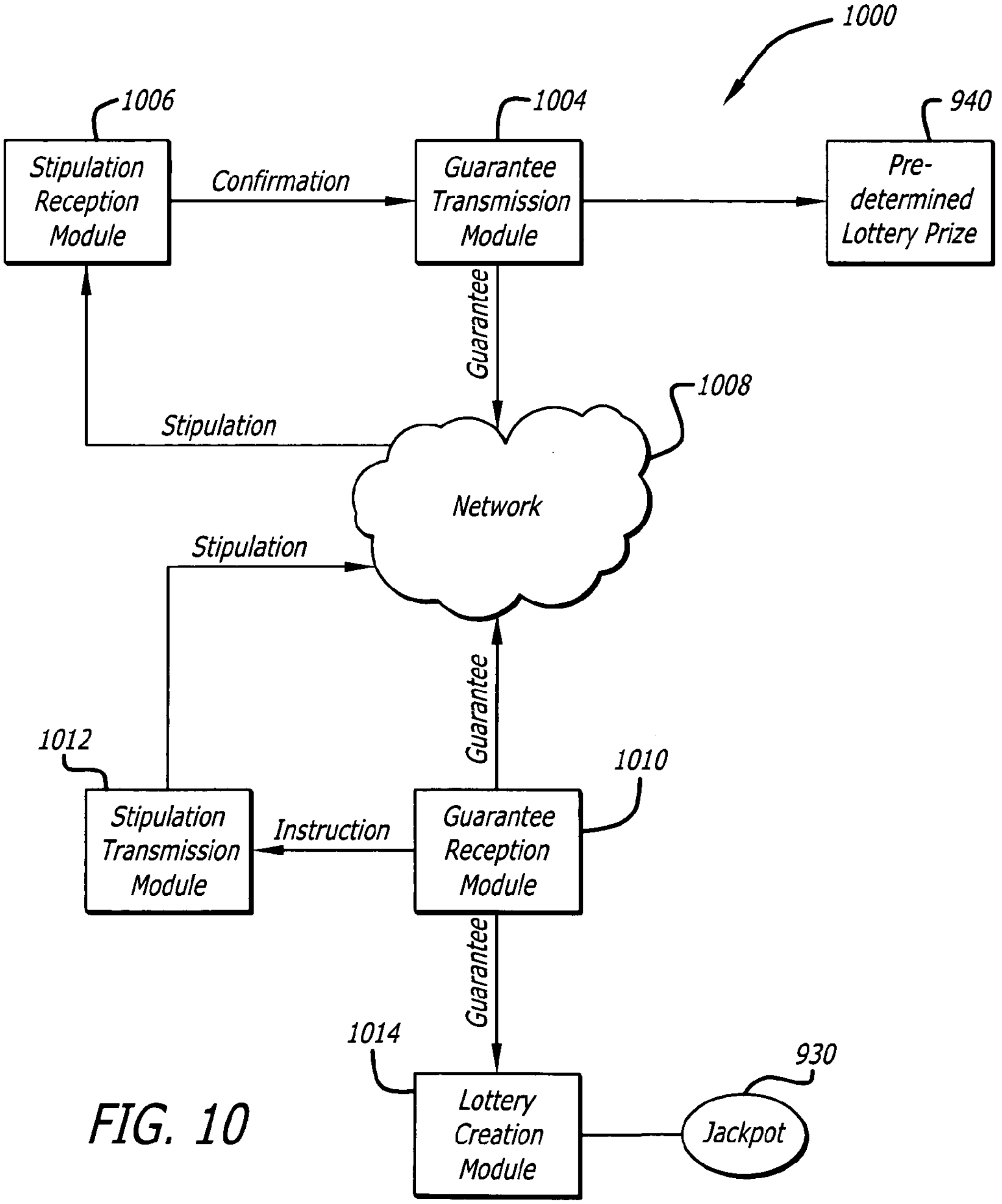
FIG. 3 illustrates an example of a winnings table for the shared multiple priced single pool lottery system of FIG. 2.
FIG. 10 illustrates a probabilistic software configuration that can be used with the probabilistic lottery system in conjunction with the multiple pricing shared lottery system.

FIG. 3 illustrates an example of a winnings table 300 for the shared multiple priced single pool lottery system of FIG. 2. For example, a lottery can have a jackpot of ten million dollars. Lottery players can purchase a one-dollar ticket, a two-dollar ticket, and a three-dollar ticket. The one-dollar ticket only gives the ticket holder a chance at receiving twenty five percent of the jackpot. Therefore, the one-dollar ticket holder could at best receive two million five hundred thousand dollars if the one-dollar ticket holder did not have to share the jackpot with any other winners. The two-dollar ticket holder could at best receive five million dollars if the two-dollar ticket holder does not have to share the jackpot with any other ticket holders. Finally, the three-dollar ticket holder could at best receive the full jackpot of ten million dollars if the three-dollar ticket holder does not have to share the jackpot with any other ticket holders.

Figure 4:
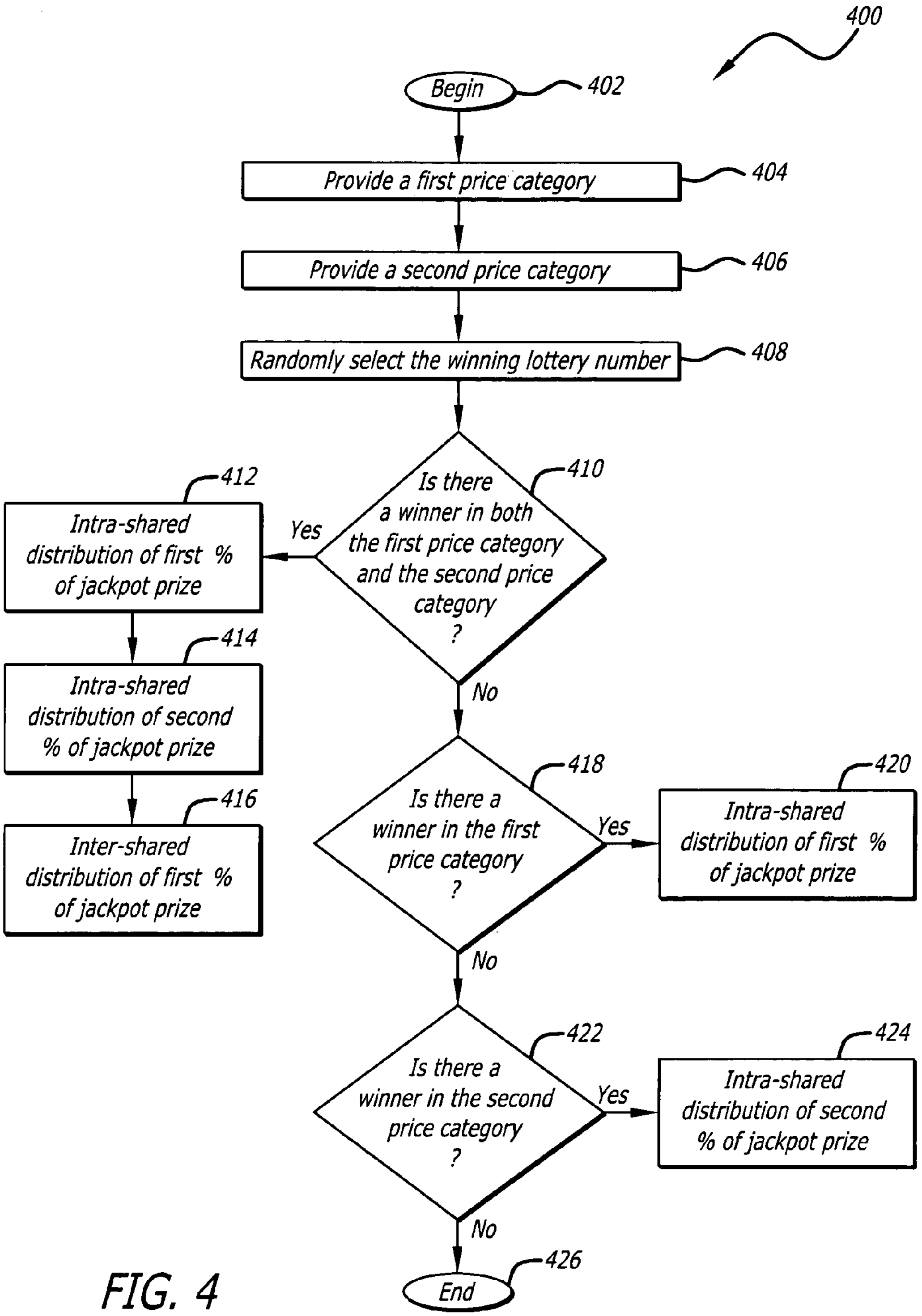
FIG. 4 illustrates a process that can be used with the shared multiple priced single pool lottery system illustrated in FIG. 2.

FIG. 4 illustrates a process 400 that can be used with the shared multiple priced single pool lottery system 200 illustrated in FIG. 2. The process 400 begins at a process block 402. The process 400 advances to a process block 404 to provide a first price category. Further, the process 400 then advances to a process block 406 to provide a second price category. The process then advances to a process block 408 to randomly select the winning lottery number. The process 400 then advances to a decision block 410 where it is determined whether there is a winner in both the first price category and the second price category. If there is a winner in both the first price category and the second price category, then the process 400 advances to a process block 412 where the first percentage of the jackpot prize is distributed through an intra-shared distribution as discussed in FIG. 2. The process 400 then advances to a process block 414 where the second percentage of the jackpot prize is distributed through an intra-shared distribution as discussed in FIG. 2. The process 400 then advances to a process block 416 where the first percentage is distributed through an inter-shared distribution of the jackpot so that the winning ticket holders in the second price category receive the appropriate share of the first percentage.

If the decision block 410 determines that there is not both a winner in the first price category and a winner in the second price category, the process 400 advances to a decision block 418. At the decision block 418, the process 400 determines if there is a winner in the first price category. If there is a winner in the first price category, the process 400 advances to a process block 420 where the process 400 distributes the jackpot prize through an intra-shared distribution to a winner or winners in the first price category. If the decision block 418 determines that there is not a winner in the first price category, the process 400 advances to a decision block 422 to determine if there is a winner in the second price category. If there is a winner in the second price category, the process 400 advances to a process block 424 where the process 400 distributes the jackpot prize through an intra-shared distribution to winners in the second price category. If there is not a winner in the second price category, the process 400 determines that there are not any winners and the process ends at process block 426. In one embodiment, there is a roll over. In one embodiment, the jackpot is used in a future draw. In one embodiment, the roll over includes a percentage of the jackpot for use in a future draw. In one embodiment, the lottery operator 102 takes a percentage of the ticket sales revenue and adds that percentage to a future lottery jackpot even if there is a winner in the present jackpot. The process 400 can be extended to cover three price categories. Further, the process 400 can be extended to cover any number of price categories. In one embodiment, the process 400 can be implemented on a computer readable medium.

Figure 5:
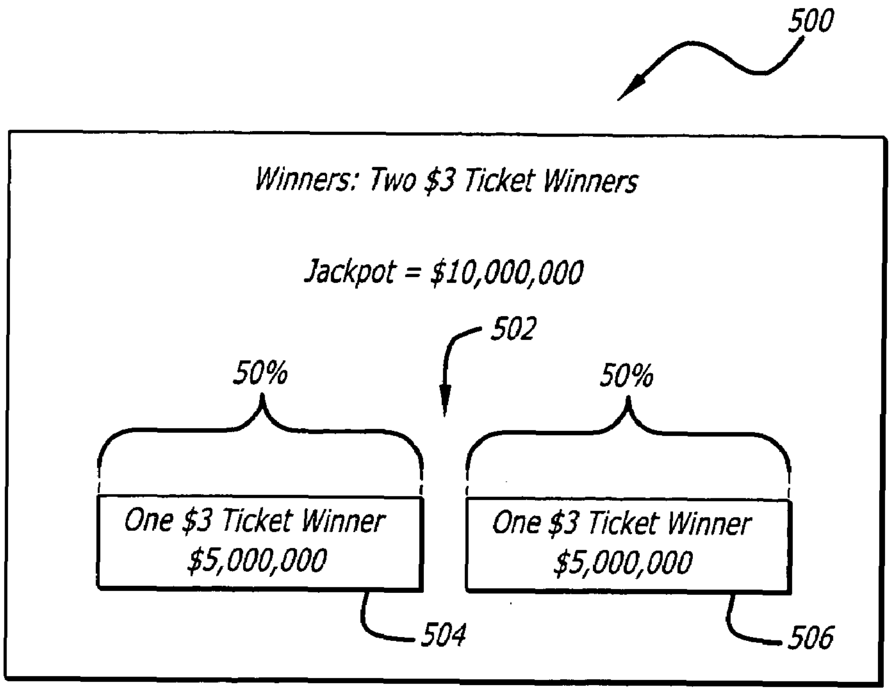
FIGS. 5 through 8 illustrate various examples of the multiple priced single prize lottery system.

FIGS. 5 through 8 illustrate various examples of the multiple priced single prize lottery system 200. FIG. 5 illustrates an example of a winnings table 500 of a lottery having two three-dollar ticket winners. The jackpot is for ten million dollars. The distribution displays one three-dollar ticket winner sharing the ten million dollar jackpot with another three-dollar ticket winner through an intra-sharing distribution. One of the three-dollar ticket winners receives five million dollars at a sharing section 504. Further, the other three-dollar ticket winner receives five million dollars at a sharing section 506.

Figure 6:
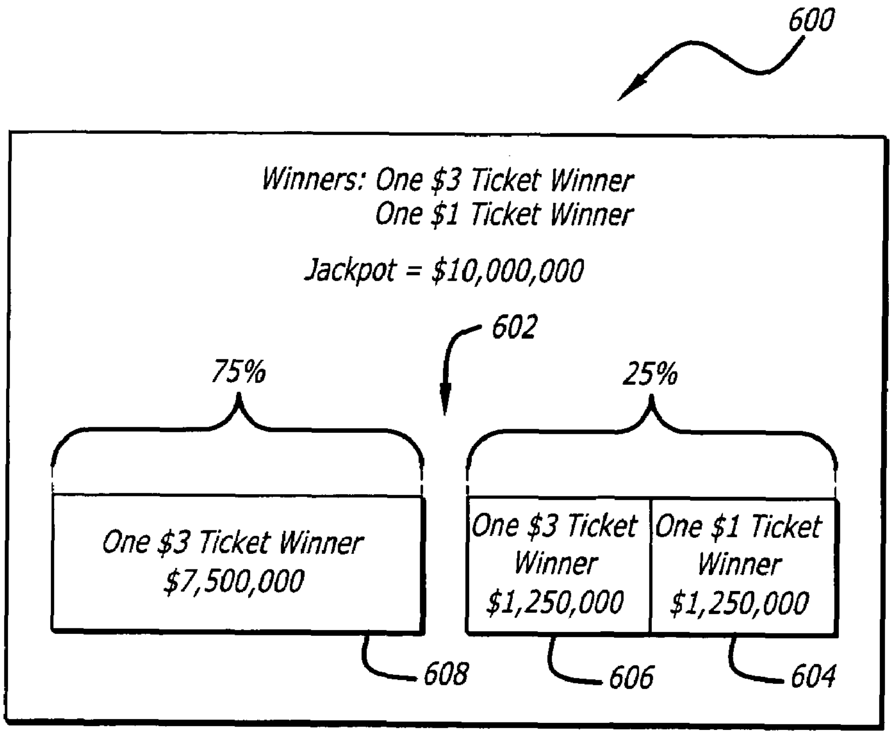

FIG. 6 illustrates an example of a winnings table 600 of a lottery having one three-dollar ticket winner and one one-dollar ticket winner. The jackpot is for ten million dollars. The distribution 602 displays one three-dollar ticket winner that shares the jackpot with one one-dollar ticket winner. The one-dollar ticket winner receives one million two hundred fifty thousand dollars at a section 604 through an intra-sharing distribution. Further, the three-dollar ticket winner receives one million two hundred fifty thousand dollars through an intra-sharing distribution at an intra-sharing section 606. Finally, the three-dollar ticket winner receives seven million five hundred thousand dollars at a section 608 through an inter-shared distribution.

Figure 7:
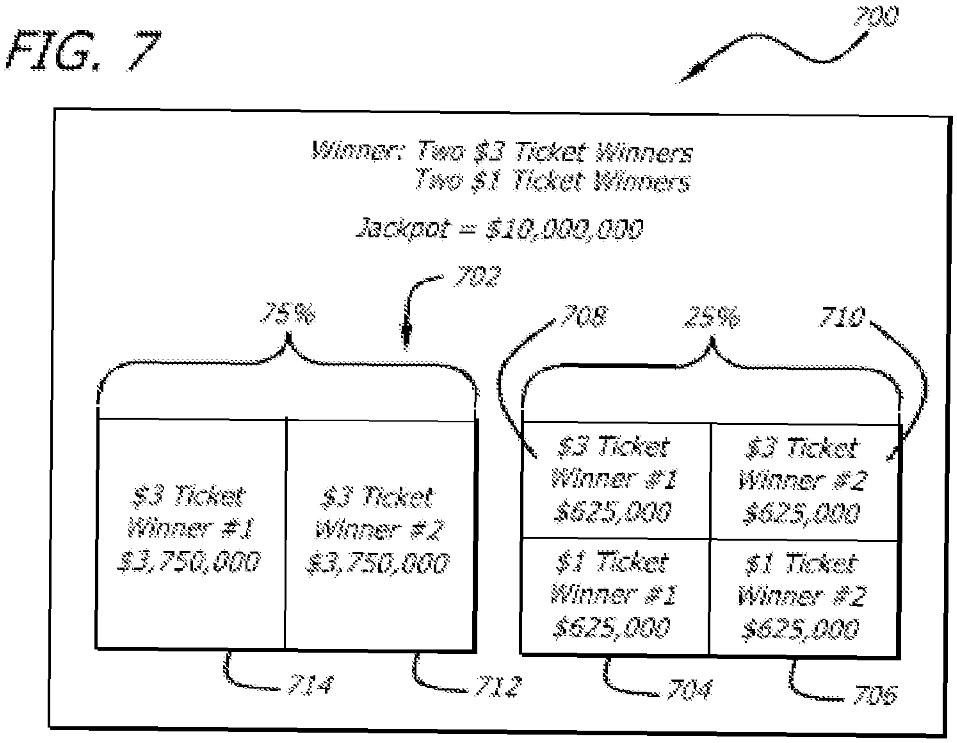

FIG. 7 illustrates an example of a winnings table 700 of a lottery having two three-dollar ticket winners and two one-dollar ticket winners. The jackpot is for ten million dollars. A distribution 702 displays a one dollar winner receiving six hundred twenty five thousand dollars in a section 704, a one dollar winner receiving six hundred twenty five thousand dollars in a section 706, a three dollar winner receiving six hundred twenty five thousand dollars at a section 708, and a three dollar winner receiving six hundred twenty five thousand dollars at a section 710. The one-dollar ticket winners receive their winnings through an intra-shared distribution. Further, the three-dollar ticket winners receive a portion of the twenty five percent associated with the first price category through an inter-shared distribution and then received a divided intra-shared portion of half of the twenty five percent. Further, each of the three-dollar ticket holders receives an additional three million seven hundred fifty thousand dollars through an intra-shared distribution of the one hundred percent minus the twenty five percent.

Figure 8:
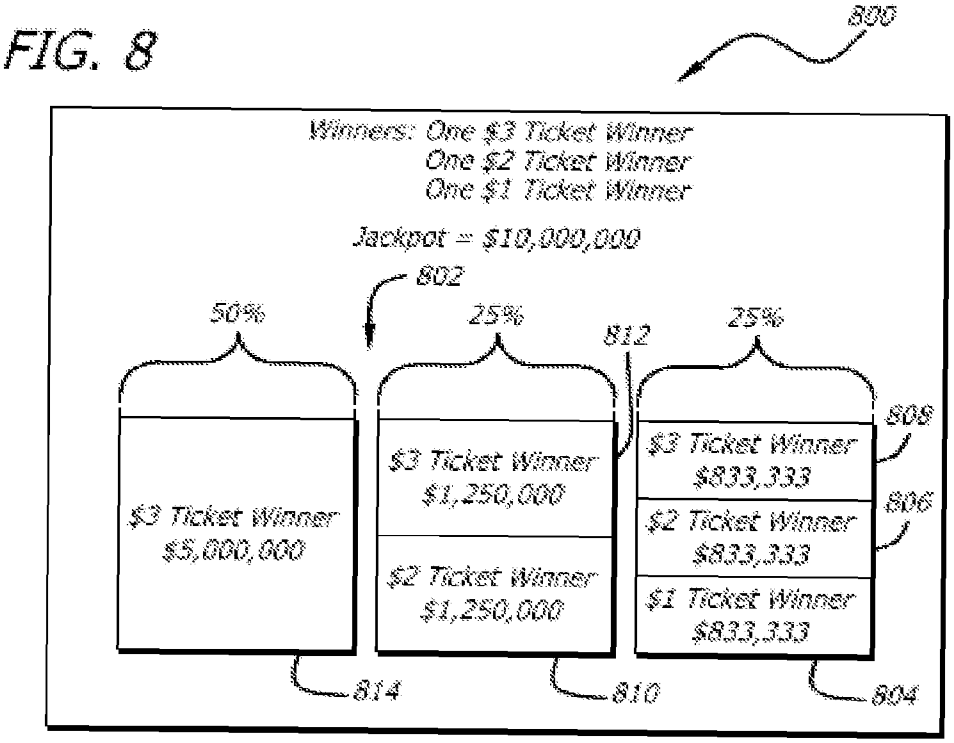

FIG. 8 illustrates an example of a winnings table 800 of a lottery having one three-dollar ticket winner, one two-dollar ticket winner, and one one-dollar ticket winner. The jackpot is for ten million dollars. A distribution 802 displays a one dollar winner receiving eight hundred thirty three thousand dollars in a section 804 according to an inter-shared distribution of twenty five percent of the jackpot. The two-dollar ticket holder also receives eight hundred thousand thirty three dollars in a section 806 according to the inter-shared distribution of twenty five percent of the jackpot. Accordingly, the three-dollar ticket holder also receives eight hundred thousand thirty three dollars in a section 808 according to the inter-shared distribution of twenty five percent of the jackpot. Further, the two-dollar ticket holder receives an additional one million two hundred fifty thousand dollars at a sharing section 810 through an inter-shared distribution of the second price category. In addition, the three-dollar ticket holder receives an additional one million two hundred fifty thousand dollars at a sharing section 812 through an inter-shared distribution of the second price category. Finally, the three-dollar ticket holder receives an additional five million dollars at a section 814 because the third percentage minus the second percentage equals fifty percent. In one embodiment, the ticket holder in the highest price category receives the percentage associated with the highest price category minus the next highest percentage of a winning ticket without an inter-sharing distribution. Intra-sharing distribution may occur in this remainder. Alternative embodiments will allow for different methodologies for calculating the remainder.

Figure 9:
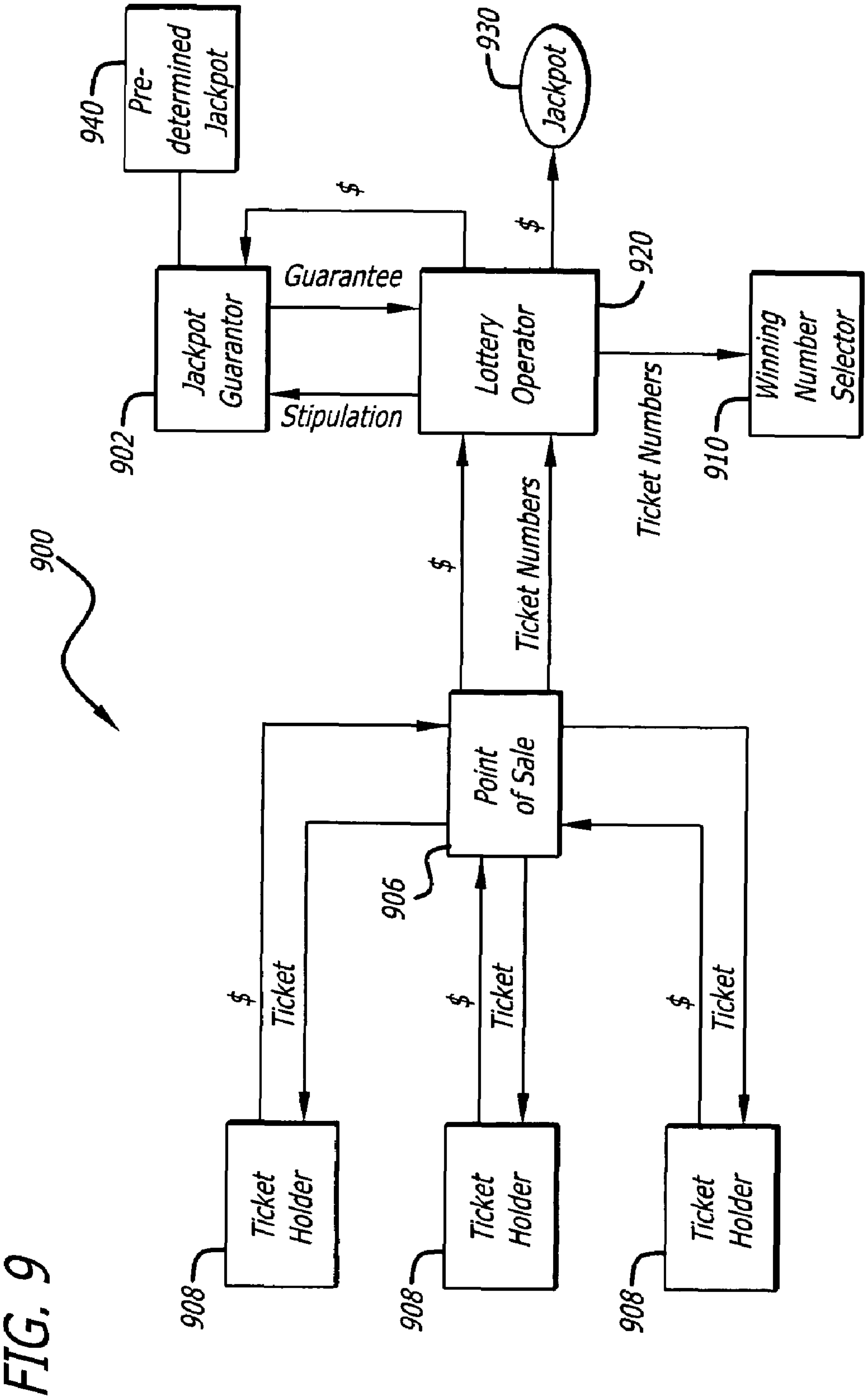
FIG. 9 illustrates a probabilistic lottery system.

FIG. 9 illustrates a probabilistic lottery system 900. The multiple pricing shared lottery system 200 can be used in conjunction with the probabilistic lottery system 900. A jackpot guarantor 902 assumes the risk that would normally be assumed by the lottery operator 920. In one embodiment, the jackpot guarantor 902 is a private organization other than a jurisdiction. In another embodiment, the jackpot guarantor is a publicly held company other than a jurisdiction. The jackpot guarantor 902 establishes a pre-determined jackpot 940. In one embodiment, the pre-determined jackpot 204 is a very large prize that will invoke ticket holders 108 that would not normally purchase a lottery ticket to purchase a lottery ticket. The lottery operator 920 can advertise with the pre-determined jackpot 204 in order to invoke higher ticket sales than would otherwise be achieved. In one embodiment, the pre-determined jackpot 940 does not actually contain any funds. Rather, the jackpot guarantor 902 determines the pre-determined jackpot 940 that is large enough so that there is a low probability of generating ticket sales that are less than the pre-determined jackpot 940. If the ticket sales are less than the pre-determined jackpot 940, the jackpot guarantor 902 assumes the risk for paying the difference between the ticket sales and the pre-determined jackpot 930.

In one embodiment, the jackpot guarantor 902 provides a guarantee to the lottery operator 920. In one embodiment, the guarantee provides that the jackpot guarantor 902 assumes the risk for paying the pre-determined jackpot if the ticket sales are not sufficient to cover the pre-determined jackpot. In another embodiment, the guarantee provides that the jackpot guarantor assumes the risk for paying a portion of the pre-determined jackpot for any secondary prizes that are won.

In one embodiment, the jackpot guarantor 902 provides the guarantee in exchange for a stipulation. In one embodiment, the stipulation includes an obligation by the lottery operator 920 to provide a percentage of revenue generated from future ticket sales in exchange for the guarantee. In another embodiment, the stipulation includes an obligation by the lottery operator 920 to provide a fee in exchange for the guarantee.

The lottery operator 920 receives payments for ticket sales from the point-of-sale 106. Further, the lottery operator 920 receives ticket numbers from the tickets sold to the ticket holders 108 from the point-of-sale 906. The lottery operator provides the ticket numbers to the winning number selector 910.

In one embodiment, the jackpot guarantor 902 places the funds in the pre-determined jackpot 940. Therefore, the lottery operator can advertise a large prize because another entity actually has the large prize.

FIG. 10 illustrates a probabilistic software configuration 1000 that can be used with the probabilistic lottery system in conjunction with the multiple pricing shared lottery system 200. As can be seen from FIG. 10, the probabilistic software configuration 1000 includes software for establishing a guarantee for a pre-determined lottery prize 940. A guarantee transmission module 404 transmits the guarantee through a network 1008. The network 1008 can be a wide area network, a local area network, the network, a wireless network, or any other network known to one of ordinary skill in the art. The guarantee transmission module 1004 transmits the guarantee in exchange for a stipulation. In one embodiment, the stipulation can be an obligation for a percentage of future ticket sales. A stipulation reception module 1006 receives the stipulation through the network 408. In one embodiment, after the stipulation reception module 1006 receives the stipulation, the stipulation reception module 1006 transmits a confirmation that the stipulation was received to the guarantee transmission module 1004.

A guarantee reception module 1010 receives the guarantee from the network 1008. In one embodiment, upon receiving the guarantee, the guarantee reception module 1010 provides an instruction to a stipulation transmission module 1012. The stipulation transmission module 1012 then sends the stipulation through the network 1008. As discussed above, the stipulation reception module 1006 can receive the stipulation and send the confirmation to the guarantee transmission module 1004 that the guarantee has been sent and the stipulation, in exchange for which the guarantee was sent, has been received.

The embodiments discussed above provide an inducement for a purchaser of a lottery ticket to buy a higher priced lottery ticket as opposed to a lower priced lottery ticket. By purchasing the higher priced lottery ticket, the ticket holder is provided with an opportunity to win a disproportionately larger portion of the jackpot than could be won by purchasing a lower priced lottery ticket.

Additional embodiments will now be discussed that can be utilized to provide even further inducement to increase ticket sales. One difficulty facing all lotteries is that the lines for purchasing lottery tickets on the day of the main lottery draw are normally very long. Many would-be lottery ticket purchasers are discontented by these long lines and decide not to purchase lottery tickets. Accordingly, ticket sales revenue does not reach its full potential.

In addition, vendors that sell lottery tickets often lose potential sales for non-lottery related goods because of the long lines. Therefore, vendors also become discontented and consider discontinuing the sale of lottery tickets to maximize their core businesses.

As a further inducement to increase ticket sales, a single lottery ticket can be provided which includes multiple distinct lottery numbers, each of these distinct lottery numbers corresponding to a distinct lottery game. In one embodiment, one of the lottery games can be a main lottery game, which is based on a shared jackpot as described in one of the previous embodiments, and the other lottery game can be an instant daily game that is based on a fixed prize. The instant daily game has a separate lottery drawing from the main lottery game drawing and occurs on a day prior to the main lottery game drawing. By being entered into the main draw as well as the instant daily draw, the purchaser is induced to buy a lottery ticket on a day earlier than the main draw. Accordingly, lines for purchasing lottery tickets on the day of the main draw are diminished, and would-be purchasers are more likely to buy lottery tickets. Therefore, ticket sales revenue can be effectively increased.

In addition, the instant daily game provides incentive for lottery ticket holders that are interested in short-term gratification to purchase a lottery ticket for the main game. A large group of ticket holders exists that is purely interested in instant games, which are lottery-type games such as scratch-off games that normally determine a winner on the day of purchase. These ticket holders generally do not want to wait a couple days for a main draw. By providing a daily game (referenced to herein as the "instant daily game") on the same ticket as a game for a main lottery, the daily game players that would normally be averse to purchasing the main lottery ticket are more likely to purchase the ticket with the instant game and the main lottery game to be entered into both games.

Further, the lottery ticket with the instant daily game and the main lottery game provides the ticket holder with the notion that the instant daily game is a bonus game. The purchaser can view the bonus game as effectively reducing the cost of the main lottery draw. For instance, if the purchaser buys a three-dollar ticket, the purchaser can view the three-dollar ticket as a cost of three dollars to enter the main lottery draw and a free bonus instant daily game. The purchaser likely associates the value of the bonus instant daily game with other instant games. For example, the purchaser may view the instant daily game as being worth one dollar. Therefore, the purchaser can view the purchase of the lottery ticket as a savings of one dollar on an instant game or as a one dollar purchase of an instant game and a two dollar purchase of a main lottery game worth three dollars. In either situation, the purchaser is induced to utilize the money that was saved and purchase another ticket. For instance, in the above example the purchaser can view the savings as being one dollar and can buy an additional ticket for one dollar.

Further, vendors are more likely to participate in selling lottery tickets knowing that selling lottery tickets will help grow rather than diminish sales of non-lottery products. They also benefit from a game structure designed to stimulate an increase in lottery sales. By having a larger vendor network, a lottery has more points of sale and can therefore further increase lottery ticket sales.

In one embodiment, the instant daily game can provide for a fixed prize that is significantly higher than traditional fixed prizes associated with instant lottery games as typically offered. The price of the lottery ticket may allow the ticket holder to potentially win a fixed prize that would normally cost a greater amount in other lotteries. For instance, a one-dollar ticket may allow a ticket holder to win a fixed prize of twenty-five thousand dollars, which is a fixed prize that may normally be offered only for a price of a two-dollar ticket in a traditional lottery format. Accordingly, a ticket holder can potentially win the same fixed prize but for one dollar less. Therefore, the ticket holder may take what is viewed as a one dollar saving and purchase another one-dollar ticket. Alternatively, the ticket holder may be induced to simply purchase a three-dollar ticket so that the ticket holder can win a bigger fixed prize and also be eligible for a disproportionately larger percentage of the jackpot from the main lottery game than with the one-dollar ticket. The example provided above does not seclude small variations between the prize offered in a traditional instant game and the prize offered in the instant daily game discussed above. In other words, even the notion of an effective savings of a fraction of a dollar may be sufficient to provide inducement for in creased ticket sales.

Figure 11:
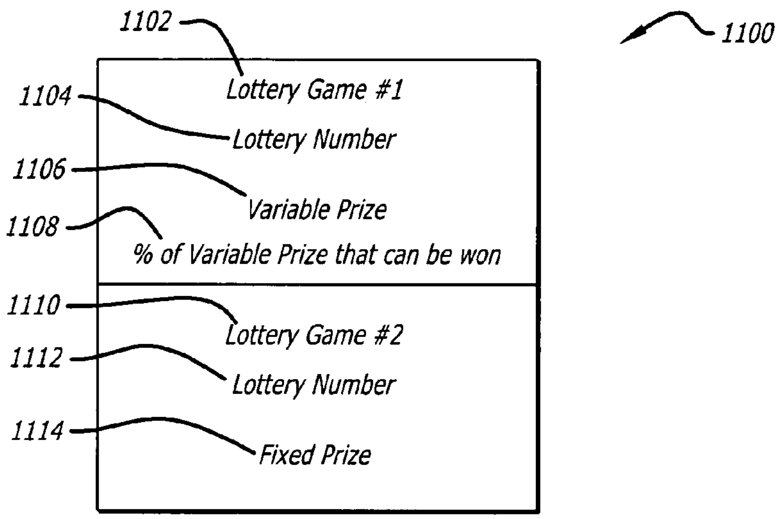
FIG. 11 illustrates an embodiment of a lottery ticket that provides a plurality of lottery numbers, each of which corresponds to one of a plurality of distinct lottery games.

FIG. 11 illustrates an embodiment of a lottery ticket 1100 that provides a plurality of lottery numbers, each of which corresponds to one of a plurality of distinct lottery games. The lottery ticket 1100 includes a first lottery game 1102 and a second lottery game 1110. In one embodiment, the first lottery game 1102 is distinct from the second lottery game 1110. The lottery ticket 1100 includes a first lottery number 1104 that a ticket holder of the lottery ticket 1100 hopes will match the drawing of the first lottery game 1102. In one embodiment, the first lottery number is selected by the ticket holder. In another embodiment, the first lottery number is a quick pick, which is a computer generated random number for the ticket holder. In yet another embodiment, the first lottery number is a pre-printed number on the lottery ticket 1100.

The first lottery game 1102 is associated with a variable prize 1106, which increases based upon ticket sales. For instance, a portion of each ticket sale can be provided to increase the variable prize. In one embodiment, the variable prize is a progressive jackpot. In addition, a percentage 1108 of the variable prize that can be won is indicated on the lottery ticket 1100. The percentage 1108 is chosen from a plurality of percentages. In one embodiment, each percentage is associated with a price 1101. An example of a percentage format is a one-dollar ticket associated with twenty-five percent of the variable prize, a two-dollar ticket associated with fifty percent of the variable prize, and a three-dollar ticket associated with one hundred percent of the variable prize.

In addition, the second lottery game 1110 is associated with a fixed prize 1114 that can be won with a winning lottery number. The lottery ticket 1100 includes a first lottery number 1104 that a ticket holder of the lottery ticket 1100 hopes will match the drawing of the second lottery game 1102. In one embodiment, the fixed prize can be a daily instant fixed prized as discussed above. The fixed prize 1114 is selected from a plurality of fixed prizes, each fixed prize being associated with a price. The fixed prize 1114 is associated with the price 1101 that also determines the percentage for the variable prize.

By having the same price 1101 for the first lottery game 1102 and the second lottery game 1110, a lottery ticket provider can further induce ticket sales, thereby creating an increase in ticket sales revenue. For instance, a lottery ticket holder may want to buy the lottery ticket because multiple lottery drawings are provided for distinct lottery games. Further, the lottery ticket holder may be more inclined to purchase a higher price ticket than a lower price ticket knowing that the higher price ticket makes the ticket holder eligible for both a disproportionately higher variable prize and a disproportionately higher fixed prize.

Accordingly, a ticket holder can see that a one-dollar ticket can at most provide a variable prize distribution of twenty five percent and a two-dollar ticket can at most provide a variable prize distribution of fifty percent, while a three-dollar ticket can provide a variable prize distribution of one hundred percent. Therefore, a ticket holder will be induced to purchase the three-dollar ticket.

Figure 12:
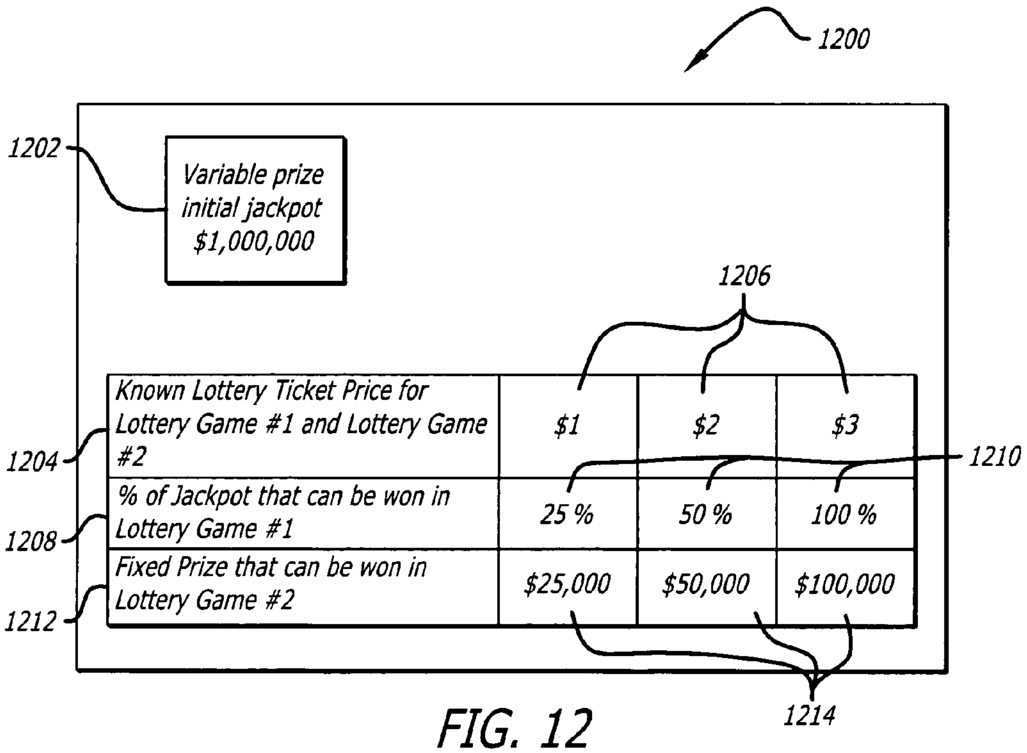
FIG. 12 illustrates one embodiment of the pricing format utilized to provide the lottery ticket displayed in FIG. 11.

FIG. 12 illustrates one embodiment of the pricing format 1200 utilized to provide the lottery ticket 1100 displayed in FIG. 11. A potential ticket holder can utilize the pricing format 1200 to determine the distributions for the variable prize 1106 and the fixed prize 1114 based on the price of the lottery ticket 1100 that is purchased. A variable prize indication 1202 indicates the value of the initial jackpot. The value of the initial jackpot is provided so that a ticket holder can calculate the potential distribution of the jackpot. Further, a lottery game label 1204 indicates the lottery games that the player can enter for the single price 1101. For instance, the player can enter both the first lottery game 1102 and the second lottery game 1110. The player can buy the lottery ticket 1100 for one of the plurality of ticket prices 1206. For example, the ticket prices can be one dollar, two dollars, and three dollars. A percentage label 1208 indicates the percentages associated with each of the prices. A plurality of percentages 1210 is provided that correspond to each of the prices 1206. For instance, a one-dollar ticket is associated with twenty-five percent, a two-dollar ticket is associated with fifty percent, and a three-dollar ticket is associated with one hundred percent. In addition, a fixed prize label 1212 indicates that a fixed prize can be won in the second lottery game 1110. Further, a plurality of fixed prizes 1214 are indicated once for each of the price categories 1206. For instance, a one-dollar ticket holder can win a twenty-five thousand dollar fixed prize, a two-dollar ticket holder can win a fifty thousand dollar prize, and a three-dollar ticket holder can win a one hundred thousand dollar prize. In one embodiment, the fixed prizes are not shared. For instance, in the above example, if a one-dollar ticket holder and a three-dollar ticket holder win the same instant game, the one-dollar ticket holder wins twenty-five thousand dollars and the three-dollar ticket holder wins one hundred thousand dollars. In an alternative embodiment, the fixed prizes can be shared.

Figure 13:
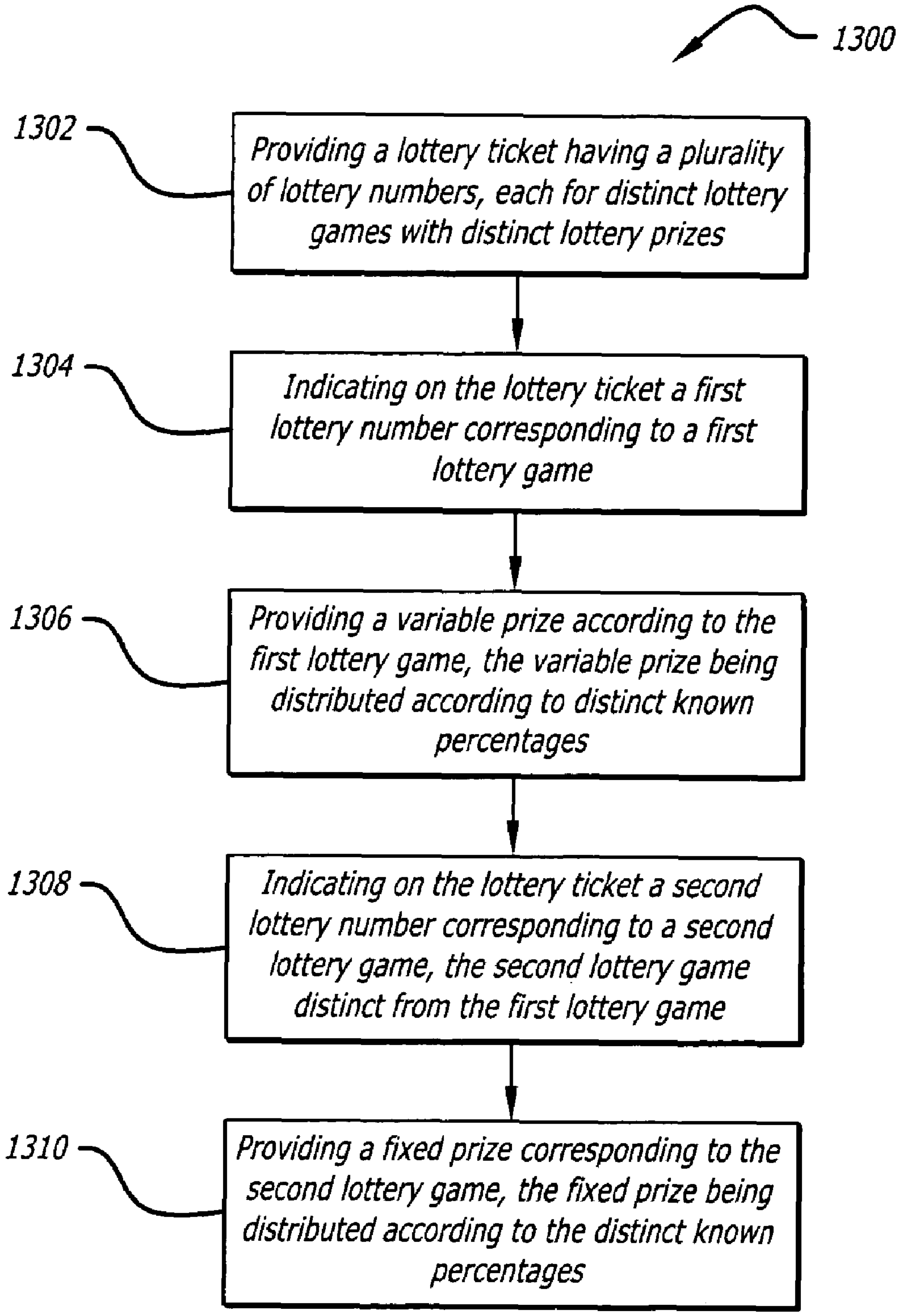
FIG. 13 illustrates a process for providing the lottery ticket with multiple lottery games.

FIG. 13 illustrates a process 1300 for providing the lottery ticket 1101 with multiple lottery games. At a process block 1302, the process 1300 provides a lottery ticket having plurality of lottery numbers. Each of the lottery numbers is for a distinct lottery game with distinct lottery prizes. At a next process block 1304, the process 1300 indicates on the lottery ticket a first lottery number corresponding to the first distinct lottery game. Further, at the next process block 1306, the process 1300 provides a variable prize according to the first distinct lottery game. The variable prize is distributed according to known percentages. In addition, at a process block 1308, the process 1300 indicates on the lottery ticket a second lottery number corresponding to a second distinct lottery game. Finally, at a process block 1310, the process 1300 provides a fixed prize corresponding to a second distinct lottery game. The fixed prize is distributed according to distinct known percentages or amounts.

Figure 14:
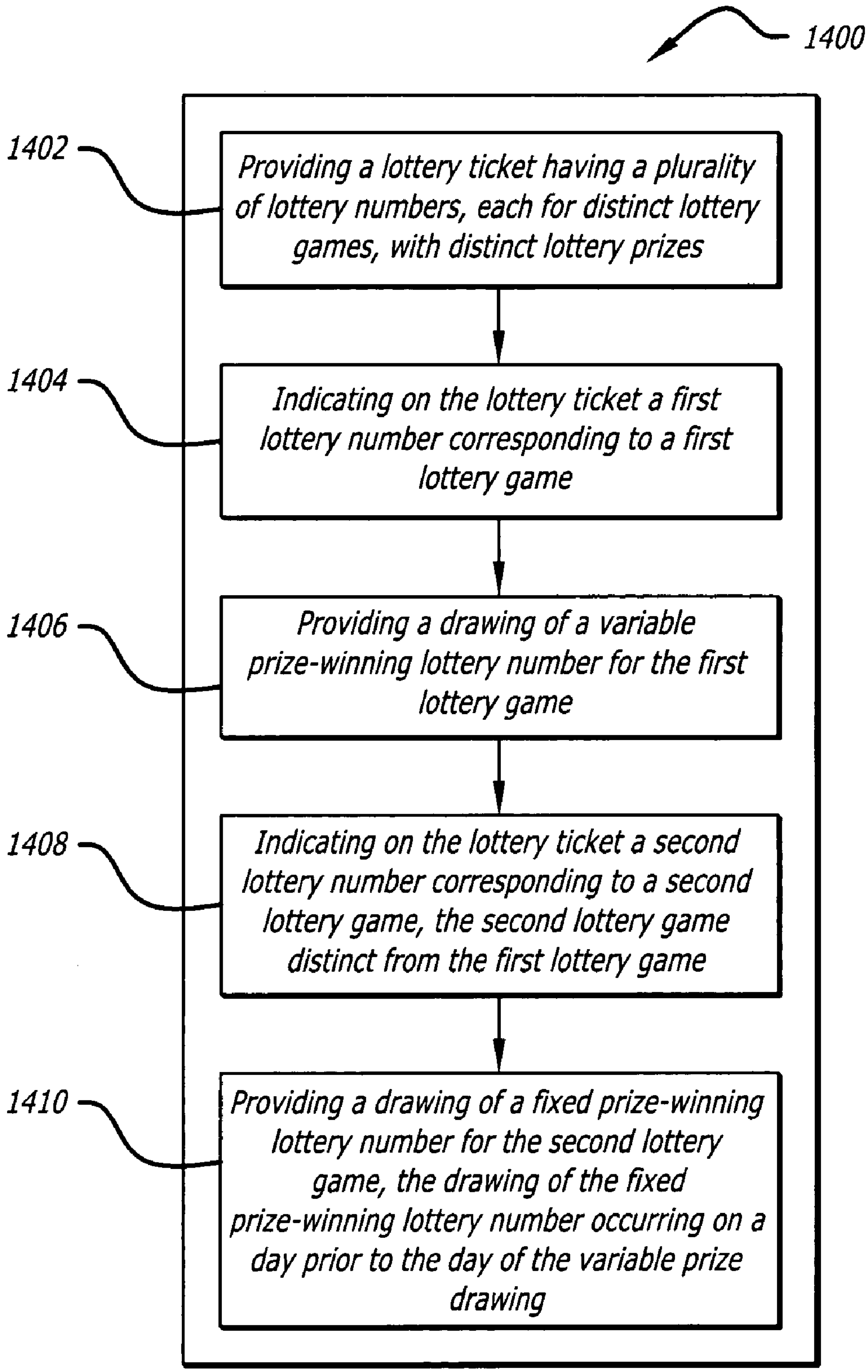
FIG. 14 illustrates a process that implements the fixed prize as a daily instant game.

FIG. 14 illustrates a process 1400 that implements the fixed prize 1114 as a daily instant game. At a process block 1402, the process 1400 provides a single lottery ticket with a plurality of lottery numbers, each of which corresponds to a distinct lottery game. Further, at a process block 1404, the process 1400 indicates on the lottery ticket a first lottery number corresponding to the first distinct lottery game. In addition, at a process block 1406, the process 1400 provides a drawing of a variable prize winning lottery number for the first distinct lottery game. At a process block 1408, the process 1400 indicates on the lottery ticket a second lottery number corresponding to a second distinct lottery game. Finally, at a process block 1410, the process 1400 provides a drawing of a fixed prize winning lottery number on a day prior to the day of the variable prize drawing. By a "day prior", it is meant to mean any day before the day of the drawing, whether that is one, two, three, etc. days before the day of the drawing.

The lottery ticket with the main lottery game and instant game can provide a further increase in lottery ticket sale revenues because the player is given more opportunities to purchase additional lottery tickets at a jackpot size that meets or surpasses the player's jackpot threshold levels. In a traditional pari-mutuel lottery, lottery players must normally wait until the day of the main lottery draw to determine if the main jackpot meets or surpasses their jackpot thresholds. In the embodiments discussed above, the lottery ticket holders can purchase a lottery ticket days before the main lottery draw, at a jackpot level that may meet their expectations. Accordingly, these ticket holders can buy additional tickets on days leading up to, and in one embodiment, on the day of the main draw. The ticket holder may lose the initial instant daily game and may want to therefore buy additional tickets in subsequent days to play the subsequent instant daily games. One of the incentives is that each ticket that has a losing daily instant game potentially has a winning main lottery game. Therefore, the ticket holder is induced to purchase multiple lottery tickets, thereby increasing lottery ticket sales.

In an alternative embodiment, the fixed prize 1114 in the second lottery game 1110 can be a fixed-variable combination prize. By the term "fixed-variable combination prize", it is meant that a prize has a fixed prize distribution and can also increase above the fixed prize by a portion received from ticket sales. In one embodiment, the ticket holder would be eligible for the fixed prize corresponding to the price of the lottery ticket 1101 and a percentage of a variable prize distribution. In one embodiment, the percentage format can be the same as for the first lottery game 1102. In another embodiment, the percentage format is different from that of the first lottery game 1102.

In one embodiment, a ticket holder that wins a fixed-variable combination prize does not share the fixed prize portion or the variable prize portion with other winners according to the sharing methodologies described above. In another embodiment, the ticket holder that wins a fixed-variable combination prize does not share the fixed prize portion but shares the variable portion with other winners according to the sharing methodologies described. For instance, intra-sharing and/or inter-sharing methodologies can be utilized. Accordingly, in these embodiments, a first portion of ticket sales can be contributed to the variable prize of the first lottery game 1102 based on the variable prize 1106, and a second portion of ticket sales can be contributed to the fixed-variable combination prize of the second lottery game 1110. The progressive aspect seen in this embodiment of both lottery games may provide further inducement for increased lottery ticket sales because the prizes in both lottery games increase.

Figure 15:
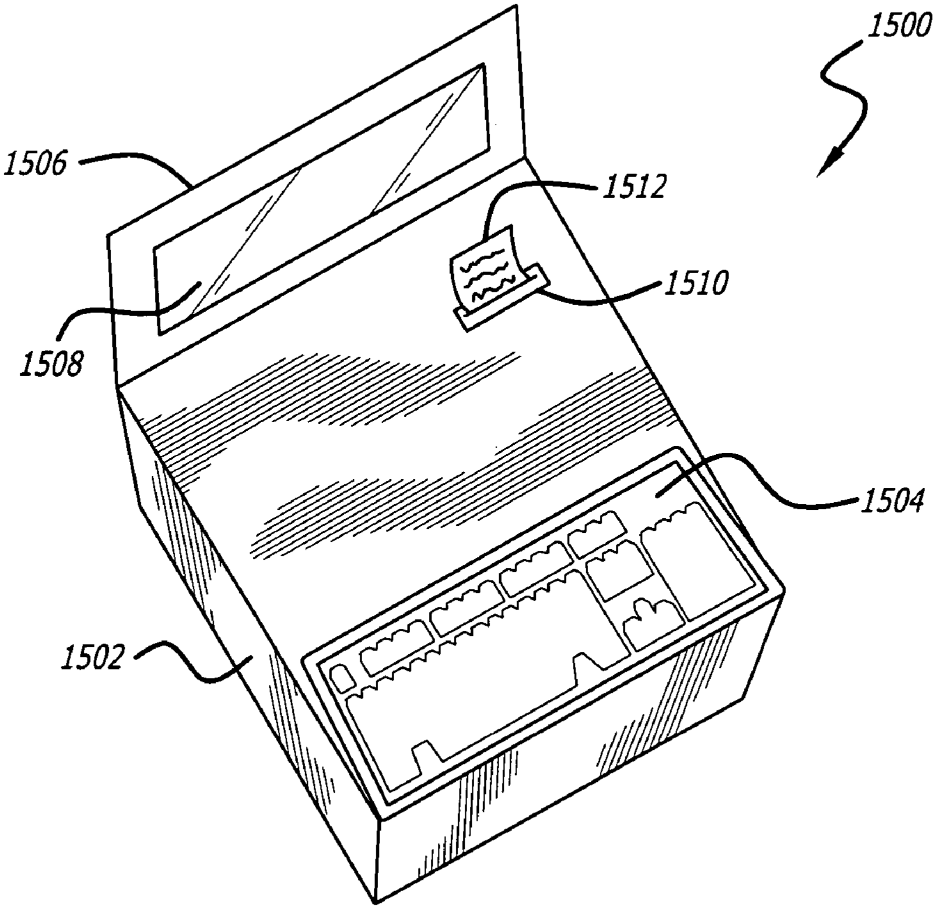
FIG. 15 illustrates a lottery ticket dispensing machine.

FIG. 15 illustrates a lottery ticket dispensing machine 1500. The different embodiments discussed above can be implemented with the use of the lottery ticket dispensing machine 1500, which can be positioned at various point-of-sale locations. For instance, the single price lottery ticket 1100 can be dispensed from the lottery ticket dispensing machine 1500. The lottery ticket dispensing machine has a housing 1502 which stores the internal components of the lottery ticket dispensing machine 1500. In addition, the lottery ticket dispensing machine 1500 also has a user input module 1504 on which a user can input data for the sale of a lottery ticket. For instance, the vendor can input a price category selected from the distinct known price categories. In one embodiment, each of the price categories has an associated variable prize distribution and an associated fixed prize distribution. Accordingly, a lottery ticket for a single price can be purchased for a main lottery draw and an instant daily game.

The price category that the vendor enters can be displayed on a screen 1508 of a display 1506. In one embodiment, the display 1506 is a graphical user interface. In another embodiment, the display 1506 displays data other than the price categories.

The vendor can then sell tickets in the respective price categories. When a purchaser would like to purchase a lottery ticket, the vendor enters the purchase information into the lottery ticket dispensing machine 1500 via the user input device 1504. In one embodiment, the user input device is a keyboard. In another embodiment, the user input device is operated by using a computer mouse. In an alternate embodiment, the user input device is a touch screen. In yet another embodiment, the user input device is voice activated. In an alternative embodiment, the display 1506 displays the purchased information that is entered via the user input device 1504.

In one embodiment, the lottery ticket dispensing machine 1500 has a payment reception module (not shown) that receives a payment for the purchase of a lottery ticket. In another embodiment, the payment reception module receives an electronic payment.

After the vendor inputs the data needed to sell a ticket from one of the selected price categories, a ticket 1512 is printed from a lottery ticket printer 1510. In one embodiment, the ticket printer 1510 is housed within the housing 1502. In another embodiment, the lottery ticket printer 1510 is positioned outside of the housing 1502 and is operably connected to the lottery ticket dispensing machine 1500. In yet another embodiment, the lottery ticket printer 1510 receives data from the lottery ticket dispensing machine 1500 through a wireless connection.

In one embodiment, the daily instant game discussed above can be used with the probabilistic lottery system discussed above. One additional reason that lines become so long at vendor locations is that the traditional pari-mutuel model typically starts with a relatively low jackpot and bases its jackpot on actual sales and not on expectation of results. Accordingly, payers tend to wait until the afternoon of the draw to buy their tickets. That is, many prospective lottery ticket purchasers want to make sure that the jackpot reaches a level that meets their purchase threshold. This purchase threshold varies from one prospective lottery ticket purchaser to another. With the probabilistic lottery system discussed above, the jackpot is initially advertised at a higher level than is normally seen in an initial jackpot provided with a traditional pari-mutuel model. Accordingly, many would-be purchasers that wait until the day of the main lottery draw for a pari-mutuel lottery to determine if the size of the jackpot meets their expectations are more likely to purchase a lottery ticket on a day prior to the day of the main lottery draw for a probabilistic lottery. By utilizing the instant daily game in a probabilistic lottery, ticket sales can be even more significantly increased because the instant daily game and the probabilistic lottery each have effective methods for shifting the timing of ticket purchases, reducing lines, and increasing ticket sales.

In one embodiment, an instant daily draw can take place on the same day as the main draw in addition to taking place on one or multiple days prior to the main draw. In yet another embodiment, an instant daily draw only takes place on the same day as the main draw.

The preceding discussion is not intended to limit the number of lottery games that can be included on a single lottery ticket with a plurality of distinct lottery games. Examples were given with two lottery games, but more lottery games can be included on a single lottery ticket.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method of providing a lottery ticket at a known single price selected from a plurality of distinct price categories, the lottery ticket being for a plurality of distinct lottery games, the method comprising:

providing the lottery ticket that is purchased for the known single price, the lottery ticket including a plurality of lottery numbers, each of the lottery numbers corresponding to a distinct lottery game with a distinct lottery prize that can be won with a winning lottery number;

indicating, on the lottery ticket, a first lottery number corresponding to a first distinct lottery game, the first distinct lottery game being won by a ticket holder of lottery ticket if the first lottery number is a winning lottery number;

providing a variable prize corresponding to the first distinct lottery game, the variable prize being distributed according to one of a plurality of distinct known percentages, a determination of the distinct known percentage of the variable prize being based on a player's selection of the known single price from the plurality of distinct price categories from which the lottery ticket can be purchased;

indicating, on the lottery ticket, a second lottery number, distinct from the first lottery number, corresponding to a second lottery game, distinct from the first lottery game, the second lottery game being won by the ticket holder of the lottery ticket if the second lottery number is a winning lottery number; and providing a fixed prize corresponding to the second lottery game, the fixed prize being distributed according to a distribution associated with the known single price.

2. The method of claim 1, wherein the first lottery game is based on a sharing percentage format.

3. The method of claim 1, wherein the second lottery game is an instant daily game.

4. The method of claim 1, wherein the first lottery number is a number determined by a potential ticket holder.

5. The method of claim 1, wherein the second lottery number is a quick pick number.

6. The method of claim 1, wherein the second lottery number is pre-printed on the lottery ticket.

7. The method of claim 1, wherein the variable prize is a probabilistic jackpot.

8. The method of claim 1, wherein the variable prize is guaranteed by a third party entity.

9. The method of claim 1, wherein the fixed prize is guaranteed by a third party entity.

10. The method of claim 1, wherein multiple winners of the variable prize share according to an intrasharing distribution.

11. The method of claim 1, wherein multiple winners of the variable distribution share according to an intersharing distribution.

12. The method of claim 1, wherein multiple winners share according to an intrasharing distribution and an intersharing distribution.

13. A method of providing a plurality of distinct lottery games on a single lottery ticket, the method comprising:

providing the single lottery ticket, the single lottery ticket being purchased for a single known price selected from a plurality of distinct price categories, the single lottery ticket including a plurality of lottery numbers, each of the lottery numbers, corresponding to a distinct lottery game with a distinct lottery prize that can be won with a winning lottery number;

indicating, on the single lottery ticket, a first lottery number corresponding to a first lottery game, the first lottery game being won by a ticket holder of the lottery ticket if the first lottery number is a winning lottery number;

providing a drawing of a variable prize winning lottery number for the first lottery game;

indicating, on the single lottery ticket, a second lottery number, distinct from the first lottery number, corresponding to a second lottery game, the second lottery game distinct from the first lottery game, the second lottery game being won by the ticket holder of the lottery ticket if the second lottery number is a winning lottery number; and providing a drawing of a fixed prize winning lottery number for the second lottery game, the drawing of the fixed prize winning lottery number occurring on a day prior to the day of the variable prize drawing.

14. The method of claim 13, wherein the first lottery game is based on a sharing percentage format.

15. The method of claim 13 wherein the second lottery game is an instant daily game.

16. The method of claim 13, wherein the first lottery number is a number determined by a potential ticket holder.

17. The method of claim 13, wherein the second lottery number is a quick pick number.

18. The method of claim 13, wherein the second lottery number is pre-printed on the lottery ticket.

19. The method of claim 13, wherein the variable prize is a probabilistic jackpot.

20. The method of claim 13, wherein the variable prize is guaranteed by a third party entity.

21. The method of claim 13, wherein the fixed prize is guaranteed by a third party entity.

22. The method of claim 13, wherein multiple winners of the variable prize share according to an intrasharing distribution.

23. The method of claim 13, wherein multiple winners of the variable prize share according to an intersharing distribution.

24. The method of claim 13, wherein multiple winners share according to an intrasharing distribution and an intersharing distribution.

25. The method of claim 24, wherein the first distinct lottery game is based on a sharing percentage format.

26. The method of claim 24, wherein the second lottery game is an instant daily game.

27. The method of claim 24, wherein the first lottery number is a number determined by a potential ticket holder.

28. The method of claim 24, wherein the second lottery number is a quick pick number.

29. The method of claim 24, wherein the second lottery number is pre-printed on the lottery ticket.

30. The method of claim 24, wherein the variable prize is a probabilistic jackpot.

31. The method of claim 24, wherein the variable prize is guaranteed by a third party entity.

32. The method of claim 24, wherein the fixed prize is guaranteed by a third party entity.

33. The method of claim 24, wherein multiple winners of the variable prize share according to an intrasharing distribution.

34. The method of claim 24, wherein multiple winners of the variable prize share according to an intersharing distribution.

35. The method of claim 24, wherein multiple winners share according to an intrasharing distribution and an intersharing distribution.

36. A method of providing a plurality of distinct lottery games in a single lottery ticket, the method comprising:

providing the single lottery ticket that is purchased for a single known price, the single lottery ticket including a plurality of lottery numbers, each of the lottery numbers corresponding to a distinct lottery game with a distinct lottery prize that can be won with a winning lottery number;

indicating, on the single lottery ticket, a first lottery number corresponding to a first lottery game, the first lottery game being won by a ticket holder of the lottery ticket if the first lottery number is a winning lottery number;

providing a drawing of a variable prize winning lottery number for the first lottery game, the first lottery game having a variable prize;

indicating, on the single lottery ticket, a second lottery number corresponding to a second lottery game, the second lottery game, distinct from the first lottery game, the second lottery game being won if the second lottery number is a winning lottery number; and providing a drawing of a fixed prize winning lottery number for the second lottery game, the second lottery game distinct from the first lottery game, the drawing of the fixed prize winning lottery number occurring on a day prior to the day of the variable prize drawing.

37. A method of providing a lottery ticket at a known single price selected from a plurality of price categories, the lottery ticket being for a plurality of distinct lottery games, the method comprising:

providing the lottery ticket that is purchased for the known single price, the lottery ticket including a plurality of lottery numbers, each of the lottery numbers corresponding to a distinct lottery game with a lottery prize that can be won with a winning lottery number;

indicating, on the lottery ticket, the first lottery number corresponding to a first lottery game, the first distinct lottery game being won by a ticket holder of the lottery ticket if the first lottery number is a winning lottery number;

providing a variable prize corresponding to a first lottery game, the variable prize being distributed according to one of a plurality of distinct known percentages, a determination of the distinct known percentage of the variable prize being based on a player's selection of the known single price from the plurality of price categories from which the lottery ticket can be purchased, the variable prize increasing by a first increase which corresponds to a first distinct portion of accumulated ticket sales;

indicating, on the lottery ticket, a second lottery number corresponding to a second lottery game, the second lottery game distinct from the first lottery game, the second lottery game being won if the second lottery number is a winning lottery number; and providing a fixed-variable combination prize corresponding to the second distinct lottery game, the fixed-variable combination prize being distributed so that a first portion is a distinct known fixed distribution and so that a second portion is a variable distribution distributed according to the distinct known percentage, the variable distribution of the second portion increasing by a second increase corresponding to a second distinct portion of accumulated ticket sales.

38. The method of claim 37, wherein the first distinct lottery game is based on a sharing percentage format.

39. The method of claim 37, wherein the second lottery game is an instant daily game.

40. The method of claim 37, wherein the first lottery number is a number determined by a potential ticket holder.

41. The method of claim 37, wherein the second lottery number is a quick pick number.

42. The method of claim 37, wherein the second lottery number is pre-printed on the lottery ticket.

43. The method of claim 37, wherein the variable prize is a probabilistic jackpot.

44. The method of claim 37, wherein the variable prize is guaranteed by a third party entity.

45. The method of claim 37, wherein the fixed prize is guaranteed by a third party entity.

46. The method of claim 37, wherein multiple winners of the variable prize-share according to an intrasharing distribution.

47. The method of claim 37, wherein multiple winners of the variable prize share according to an intersharing distribution.

48. The method of claim 37, wherein multiple winners share according to an intrasharing distribution and an intersharing distribution.

49. A lottery ticket dispensing machine, comprising:

a price category reception module, wherein the price category reception module receives a selection of a price category from a first price category and a second price category, the first price category associated with a first variable prize distribution of a first lottery game and associated with a first fixed prize distribution of a second lottery game, the second lottery game distinct from the first lottery game, the second price category associated with a second variable prize distribution of the first lottery game and associated with a second fixed prize distribution of the second lottery game, the second variable prize distribution distinct from the first variable prize distribution, the second fixed prize distribution distinct from the first prize fixed distribution;

a user input module, wherein the user input module receives an input from a user indicating a price category that the user selects from the first price category and the second price category;

a lottery ticket printer, wherein the lottery ticket printer prints a lottery ticket from the price category that is received from the price category reception module, the lottery ticket including a first lottery number for the first lottery game and a second lottery number for the second lottery game; and a controller, wherein the controller receives the first price category from the price category reception module, wherein the controller receives the second price category from the price category reception module, wherein the controller receives the input from the user, wherein the controller provides an instruction to the lottery ticket printer to print the lottery ticket according to the input.

50. The lottery ticket dispensing machine of claim 49, wherein multiple winners of the first variable prize and the second variable prize share according to an intrasharing distribution.

51. The lottery ticket dispensing machine of claim 49, wherein multiple winners of the first variable prize and the second variable prize share according to an intersharing distribution.

52. The lottery ticket dispensing machine of claim 49, wherein multiple winners share according to an intrasharing distribution and an intersharing distribution.

53. The lottery ticket dispensing machine of claim 49, wherein the first distinct lottery game is based on a sharing percentage format.

54. The lottery ticket dispensing machine of claim 49, wherein the second lottery game is an instant daily game.

55. The lottery ticket dispensing machine of claim 49, wherein the first lottery number is a number determined by a potential ticket holder.

56. The lottery ticket dispensing machine of claim 49, wherein the second lottery number is a quick pick number.

57. The lottery ticket dispensing machine of claim 49, wherein the second lottery number is pre-printed on the lottery ticket.

58. The lottery ticket dispensing machine of claim 49, wherein the first variable prize and the second variable prize is a probabilistic jackpot.

59. The lottery ticket dispensing machine of claim 49, wherein the first variable prize and the second variable prize is guaranteed by a third party entity.

60. The lottery ticket dispensing machine of claim 49, wherein the fixed prize is guaranteed by a third party entity.

61. The lottery ticket dispensing machine of claim 49, wherein the selection of the price category is from a third price category in addition to the first price category and the second price category.

62. The lottery ticket dispensing machine of claim 61, wherein the third price category is associated with a third variable prize distribution of the first lottery game and associated with a third fixed prize distribution of the second lottery game, the third variable prize distribution distinct from the first variable prize distribution and distinct from the second variable prize distribution, the third fixed prize distribution, distinct from the first fixed prize distribution and distinct from the second fixed prize distribution.

* * * * *